(12) United States Patent
Li et al.

(10) Patent No.: US 11,997,740 B2
(45) Date of Patent: May 28, 2024

(54) RADIO RESOURCE CONTROL (RRC) MESSAGE SENDING METHOD AND APPARATUS

(71) Applicant: HUAWEI TECHNOLOGIES CO., LTD., Guangdong (CN)

(72) Inventors: Bingzhao Li, Beijing (CN); Guohua Yu, Shanghai (CN); Haibo Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 357 days.

(21) Appl. No.: 17/389,909

(22) Filed: Jul. 30, 2021

(65) Prior Publication Data

US 2021/0360726 A1 Nov. 18, 2021

Related U.S. Application Data

(63) Continuation of application No. PCT/CN2020/074129, filed on Jan. 31, 2020.

(30) Foreign Application Priority Data

Feb. 1, 2019 (CN) .......................... 201910104461.6

(51) Int. Cl.
*H04W 4/02* (2018.01)
*H04W 74/0833* (2024.01)
*H04W 76/19* (2018.01)

(52) U.S. Cl.
CPC ....... *H04W 76/19* (2018.02); *H04W 74/0833* (2013.01)

(58) Field of Classification Search
None
See application file for complete search history.

(56) References Cited

U.S. PATENT DOCUMENTS

2012/0083262 A1 4/2012 Dimou et al.
2012/0224525 A1 9/2012 Wang et al.
(Continued)

FOREIGN PATENT DOCUMENTS

CN 101193095 A 6/2008
CN 101483927 A 7/2009
(Continued)

OTHER PUBLICATIONS

Mediatek Inc: "Report of Email Discussion [99#43][NB-IoT] RRC-Connection Release",3GPP Draft; R2-1710795, (Oct. 8, 2017), XP051342820, total 15 pages.
(Continued)

*Primary Examiner* — Frantz Bataille
(74) *Attorney, Agent, or Firm* — WOMBLE BOND DICKINSON (US) LLP

(57) ABSTRACT

This application provides a radio resource control (RRC) message sending method and an apparatus. According to the method, a distributed unit (DU) determines not to start an RLC polling mechanism when sending an RRC message to a terminal device, so that when sending the RRC message to UE, the DU sets a polling bit in a header of an RLC PDU carrying the RRC message to be in an inactive state. Therefore, after receiving the RRC message, the terminal device does not feed back an RLC status report to the DU. Therefore, the terminal device does not need to initiate a random access procedure to obtain an uplink transmission resource for sending the RLC status report to the DU, thereby saving random access resources.

20 Claims, 15 Drawing Sheets

(56) References Cited

U.S. PATENT DOCUMENTS

| | | | |
|---|---|---|---|
| 2013/0235830 A1 | 9/2013 | Pelletier et al. | |
| 2018/0310192 A1 | 10/2018 | Bergquist et al. | |
| 2018/0332516 A1* | 11/2018 | Oak | H04W 36/08 |
| 2019/0069333 A1* | 2/2019 | Kim | H04W 36/0033 |

FOREIGN PATENT DOCUMENTS

| | | |
|---|---|---|
| CN | 101675627 A | 3/2010 |
| CN | 101686577 A | 3/2010 |
| CN | 101944984 A | 1/2011 |
| CN | 102972066 A | 3/2013 |
| CN | 103069911 A | 4/2013 |
| CN | 103260251 A | 8/2013 |
| CN | 103298048 A | 9/2013 |
| CN | 105493607 A | 4/2016 |
| CN | 105580422 A | 5/2016 |
| CN | 105594251 A | 5/2016 |
| CN | 105917692 A | 8/2016 |
| CN | 106027210 A | 10/2016 |
| CN | 107105511 A | 8/2017 |
| CN | 108282892 A | 7/2018 |
| CN | 108293236 A | 7/2018 |
| CN | 108307519 A | 7/2018 |
| CN | 108541032 A | 9/2018 |
| CN | 108541360 A | 9/2018 |
| CN | 108631959 A | 10/2018 |
| CN | 108809528 A | 11/2018 |
| EP | 1884042 A1 | 2/2008 |
| WO | 2011102773 A1 | 8/2011 |
| WO | 2012097722 A1 | 7/2012 |
| WO | 2014088477 A1 | 6/2014 |
| WO | 2018202186 A1 | 11/2018 |

OTHER PUBLICATIONS

Intel Corporation et al: "TP for F1-UP on Flow controlenhancements", 3GPP Draft; R3-172300, (Jun. 26, 2017), XP051302247, total 10 pages.

Huawei: Discussion on Fast Retransmission and Path Switch betweenDUs for option 2 and option 3-1 3GPP Draft; R3-171230,(Apr. 3, 2017), XP051245940, total 3 pages.

Mediatek Inc., "Report of Email Discussion [99#43][NB-IoT] RRC Connection Release R2-1710795", 3GPP TSG-RAN WG2 Meeting #99bis, Oct. 13, 2017, total 15 pages.

Yali Wu,:"Uplink Resource Allocation Techniques for Massive Accesses for M2M Communications",Apr. 24, 2017, total 137 pages.

3GPP TSG-RAN WG2 Meeting #99, R2-1707600, RAN2 Chairman (Intel), Berlin, Germany, Aug. 21-25, 2017, total 19 pages.

Chalakorn Karupongsiri et al: A Hybrid Random Access Method for Smart Meterson LTE Networks, Aug. 24, 2016, total 6 pages.

* cited by examiner

RADIO RESOURCE CONTROL (RRC) MESSAGE SENDING METHOD AND APPARATUS

CROSS-REFERENCE TO RELATED APPLICATIONS

This application is a continuation of International Application No. PCT/CN2020/074129, filed on Jan. 31, 2020, which claims priority to Chinese Patent Application No. 201910104461.6, filed on Feb. 1, 2019. The disclosures of the aforementioned applications are hereby incorporated by reference in their entireties.

TECHNICAL FIELD

This application relates to the field of mobile communications technologies, and in particular, to a radio resource control RRC message sending method and an apparatus.

BACKGROUND

In new radio (NR), after establishing a connection to a cell, a terminal device is in a radio resource control (RRC) connected mode. After that, if signal quality of a link between the terminal device and the cell is continuously relatively poor, the terminal device triggers a link failure, and triggers an RRC connection reestablishment process. The RRC connection reestablishment process is to enable the terminal device to find another cell in which communication can be normally performed, and reestablish a connection. After finding a suitable cell, the terminal device initiates the RRC connection reestablishment process in the cell.

However, when performing RRC connection reestablishment, the terminal device in NR performs two times of random access (RACH), causing a waste of RACH resources.

SUMMARY

This application provides a radio resource control (RRC) message sending method and an apparatus, to save RACH resources in an RRC connection reestablishment process.

According to a first aspect, this application provides an RRC message sending method, and the method may be implemented by a distributed unit (DU). According to the method, the DU determines not to start an RLC polling mechanism when sending an RRC message to a terminal apparatus. Therefore, when sending the RRC message, the DU may set a polling bit in a header of an RLC PDU carrying the RRC message to be in an inactive state. When the polling bit is in the inactive state, it indicates that the RLC polling mechanism is not started, and after receiving the RLC message, the terminal apparatus does not feed back an RLC status report to the DU. [KE1] In one embodiment, if the polling bit is set to 1, it indicates an active state. In this case, the DU may set the polling bit to 0 when sending the RRC message.

According to the foregoing embodiment[KE2], the DU may not start the RLC polling mechanism when sending the RRC message. Therefore, after receiving the RRC message, the terminal apparatus does not feed back the RLC status report based on the RLC polling mechanism, and therefore does not need to initiate a random access procedure to send the RLC status report based on an uplink grant obtained through the random access procedure, thereby saving RACH resources.

In one embodiment, after determining that the RRC message is the first RRC message sent through a first signaling channel, the DU may determine not to start the RLC polling mechanism when sending the RRC message to the terminal apparatus. The first signaling channel may be a signaling channel between the terminal apparatus and the DU and that is resumed through an RRC reestablishment process. After the signaling channel is resumed, the DU does not start the RLC polling mechanism when the DU sends the first RRC message through the signaling channel. For example, the first signaling channel may be an SRB 1. According to this embodiment, the DU can autonomously determine not to start the RLC polling mechanism when RRC messages are sent.

In one embodiment, after receiving first information sent by a CU, the DU may determine not to start the RLC polling mechanism when sending the RRC message to the terminal apparatus. The RRC message and the first information may be sent through a same message, namely, a first message. Further, the first message may be a downlink RRC transmission message or a terminal context setup request message. In addition, the RRC message and the first information may alternatively be separately sent through different messages. For example, the CU may send the first information to the DU through a downlink RRC transmission message or a terminal context setup request message, and send the RRC message to the DU through another downlink RRC transmission message or another terminal context setup request message.

In one embodiment, the first information may be used to indicate the DU to set, when the DU sends the RRC message to the terminal apparatus, a polling bit in a header of an RLC protocol data unit (PDU) carrying the RRC message to be in an inactive state, or used to indicate the DU not to trigger polling when the DU sends the RRC message to the terminal apparatus.

In one embodiment, the DU may further send a resource indication to the terminal apparatus, where the resource indication may be used to indicate a first uplink transmission resource to the terminal apparatus, and the first uplink transmission resource may be used by the terminal apparatus to request an uplink transmission resource (for example, the terminal apparatus sends an uplink transmission resource request to the DU based on the first uplink transmission resource, and the DU may send the uplink transmission resource request to the CU or a network device to which the DU belongs). The uplink transmission resource may be used for data transmission.

In one embodiment, the RRC message may be an RRC reestablishment message. Alternatively, the RRC message may be an RRC reestablishment message and an RRC reconfiguration message. Alternatively, the RRC message may be an RRC resume message.

The method may be further implemented by a centralized unit (CU). According to the method, the CU may generate first information, and the first information may be used to indicate a distributed unit (DU) not to start an RLC polling mechanism when the DU sends an RRC message to a terminal apparatus.

According to the foregoing embodiment, the CU may indicate, by using the first information, the DU not to start the RLC polling mechanism when the DU sends the RRC message. Therefore, after receiving the RRC message, the terminal apparatus does not feed back an RLC status report based on the RLC polling mechanism, and therefore does not need to initiate a random access procedure to send the RLC status report based on an uplink grant obtained through the random access procedure, thereby saving RACH resources.

In one embodiment, the CU may be further configured to: generate the RRC message, include the RRC message and the first information in a first message, and send the first message to the DU, where the first information is used to indicate the DU not to start the RLC polling mechanism when the DU sends the RRC message. In this embodiment, the RRC message and the first information corresponding to the RRC message are sent through one message, thereby reducing interaction between the CU and the DU, and improving efficiency of sending the RRC message.

In one embodiment, the first message is a downlink RRC transmission message or a terminal context setup request message. In addition, the CU may alternatively separately send the first information and the RRC message to the DU. For example, the CU may send the first information to the DU through a downlink RRC transmission message or a terminal context setup request message, and send the RRC message to the DU through another downlink RRC transmission message or another terminal context setup request message. In this embodiment, the CU is enabled to implement, through a message in an existing RRC connection reestablishment process, the RRC message sending method provided in embodiments of this application. Therefore, in terms of implementation, a relatively small change is made to the existing RRC reestablishment process, and the implementation is relatively easy.

In one embodiment, the first information may be used to indicate the DU to set, when the DU sends the RRC message to the terminal apparatus, a polling bit in a header of an RLC protocol data unit PDU carrying the RRC message to be in an inactive state, or used to indicate the DU not to trigger polling when the DU sends the RRC message to the terminal apparatus. This embodiment can improve indication efficiency, so that the DU can efficiently determine, based on the first information, not to start the RLC polling mechanism.

In one embodiment, the RRC message may be an RRC reestablishment message. Alternatively, the RRC message may be an RRC reestablishment message and an RRC reconfiguration message. Alternatively, the RRC message may be an RRC resume message.

According to a second aspect, this application provides another RRC message sending method, and the method may be implemented by a network device. According to the method, the network device sends an RRC message and a resource indication to a terminal apparatus, where a polling bit in a header of an RLC PDU carrying the RRC message is set to be in an active state, the resource indication may be used to indicate a first uplink transmission resource, the first uplink transmission resource may be used by the terminal apparatus to request a second uplink transmission resource, and the second uplink transmission resource may be used by the terminal apparatus to send an RLC status report to the network device.

If the method is implemented by a terminal apparatus, the terminal apparatus may receive an RRC message and a resource indication from a network device, a polling bit in a header of an RLC PDU carrying the RRC message is set to be in an active state, and the resource indication may be used to indicate a first uplink transmission resource. Then, the terminal apparatus may determine, based on the polling bit, that an RLC status report needs to be sent to the network device. The terminal apparatus sends the RLC status report to the network device based on the second uplink transmission resource, where the second uplink transmission resource is a transmission resource that the terminal apparatus requests, based on the first uplink transmission resource, the network device to allocate.

According to this embodiment, the terminal apparatus feeds back the RLC status report by using the second uplink transmission resource. The second uplink transmission resource is requested by the terminal apparatus from the network device based on the first uplink transmission resource indicated by the network device. Therefore, the terminal apparatus can obtain an uplink grant without initiating random access, thereby saving RACH resources.

In one embodiment, if the RRC message is transmitted through a signaling radio bearer (SRB) 1 between the terminal apparatus and the network device, and the RLC status report is the first status report after the SRB 1 is resumed, the method further includes: The terminal apparatus triggers sending of the RLC status report after preset duration from a time point at which the terminal apparatus determines that the RLC status report needs to be sent to the network device. The preset duration may be duration preconfigured by the network device or agreed on in advance. For example, the preset duration may be 10 milliseconds. According to this embodiment, the preset duration may be used by the terminal apparatus to parse the resource indication and request the second uplink transmission resource from the network device. Therefore, the RLC status report may be sent by using the second uplink transmission resource, to avoid initiating random access.

In one embodiment, after the terminal apparatus determines, based on the polling bit, that the RLC status report needs to be sent to the network device, the method further includes: The terminal apparatus triggers a random access procedure, where the random access procedure is used by the terminal apparatus to request an uplink transmission resource from the network device, and the uplink transmission resource is used to send the RLC status report. That the terminal apparatus sends the RLC status report to the network device based on the second uplink transmission resource includes: Before determining, based on the random access procedure, an uplink transmission resource allocated by the network device, the terminal apparatus sends the RLC status report to the network device based on the second uplink transmission resource, and stops performing the random access procedure.

In one embodiment, the RRC message includes at least one of the following messages: an RRC reestablishment message, or an RRC reestablishment message and an RRC reconfiguration message, or an RRC resume message.

According to a third aspect, this application provides a communication apparatus. For example, the communication apparatus is the CU, the DU, the network device, or the terminal apparatus described above. The communication apparatus may be configured to perform the method according to any one of the first aspect or the embodiments of the first aspect, or configured to perform the method according to any one of the second aspect or the embodiments of the second aspect. In one embodiment, the communication apparatus may include a module configured to perform the method according to any one of the first aspect or the embodiments of the first aspect or any one of the second aspect or the embodiments of the second aspect. For example, the communication apparatus includes a processing module and a communication module that are coupled to each other.

If the communication apparatus is a CU, a processing module may be configured to generate first information, where the first information is used to indicate a DU not to start a radio link layer control protocol (RLC) polling mechanism when the DU sends an RRC message to a terminal apparatus. A communication module may be configured to send the first information to the distributed unit DU.

In one embodiment, the processing module may be further configured to generate the RRC message. When sending the first information to the distributed unit DU, the communication module may send a first message to the DU, where the first message includes the RRC message and the first information.

In one embodiment, the first message is a downlink RRC transmission message. Alternatively, the first message is a terminal context setup request message.

In one embodiment, the first information is used to indicate the DU to set, when the DU sends the RRC message to the terminal apparatus, a polling bit in a header of an RLC protocol data unit PDU carrying the RRC message to be in an inactive state, or the first information is used to indicate the DU not to trigger polling when the DU sends the RRC message to the terminal apparatus.

In one embodiment, the first information is carried in a downlink RRC transmission message. Alternatively, the first information is carried in a terminal context setup request message.

In one embodiment, the RRC message includes at least one of the following messages: an RRC reestablishment message, or an RRC reestablishment message and an RRC reconfiguration message, or an RRC resume message.

If the communication apparatus is a DU, a processing module may be configured to determine not to start an RLC polling mechanism when an RRC message is sent. A communication module may be configured to set, when sending the RRC message to a terminal apparatus, a polling bit in a header of an RLC PDU carrying the RRC message to be in an inactive state.

In one embodiment, the processing module may be configured to: when determining that the RRC message is the first RRC message sent to the terminal apparatus through a first signaling channel, determine not to start the RLC polling mechanism when the RRC message is sent; or the processing module may be configured to: when determining that first information sent by a CU is received, determine not to start the RLC polling mechanism when the RRC message is sent, where the first information is used to indicate the DU not to start the RLC polling mechanism when the DU sends the RRC message.

In one embodiment, the first information is used to indicate the DU to set, when the DU sends the RRC message to the terminal apparatus, a polling bit in a header of an RLC PDU carrying the RRC message to be in an inactive state, or the first information is used to indicate the DU not to trigger polling when the DU sends the RRC message to the terminal apparatus.

In one embodiment, the first information is carried in a downlink RRC transmission message. Alternatively, the first information is carried in a terminal context setup request message.

In one embodiment, the communication module may be further configured to receive a first message from the CU, where the first message includes the RRC message and the first information.

In one embodiment, the first message is a downlink RRC transmission message. Alternatively, the first message is a terminal context setup request message.

In one embodiment, the communication module may be further configured to indicate a first uplink transmission resource to the terminal apparatus, where the first uplink transmission resource is used by the terminal apparatus to request an uplink transmission resource from the DU.

In one embodiment, the RRC message includes at least one of the following messages: an RRC reestablishment message, or an RRC reestablishment message and an RRC reconfiguration message, or an RRC resume message.

If the communication apparatus is a network device, a processing module may be configured to generate an RRC message and a resource indication. The communication module may be configured to send the RRC message and the resource indication to the terminal apparatus, where a polling bit in a header of an RLC PDU carrying the RRC message is set to be in an active state, and the resource indication is used to indicate a first uplink transmission resource.

If the communication apparatus is a terminal apparatus, a processing module may be configured to determine, based on polling indication information in a header of an RLC PDU carrying the RRC message, not to send an RLC status report to the network device.

In one embodiment, the processing module may be configured to determine, based on the polling indication information in the header of the RLC PDU carrying the RRC message, to send the RLC status report to the network device, and configured to generate the RLC status report. The communication module may be configured to: request an uplink transmission resource from the network device based on a resource indication sent by the network device, and send the RLC status report to the network device based on the uplink transmission resource indicated by the network device.

In one embodiment, if the RRC message is transmitted through a signal radio bearer (SRB) 1 between the terminal apparatus and the network device, and the RLC status report is the first status report after the SRB 1 is resumed, the processing module may trigger sending of the RLC status report after preset duration from a time point at which the processing module determines that the RLC status report needs to be sent to the network device.

In one embodiment, after determining that the RLC status report needs to be sent to the network device, the processing module may further trigger a random access procedure, where the random access procedure is used by the terminal apparatus to request an uplink transmission resource from the network device, and the uplink transmission resource is used to send the RLC status report. Before determining, based on the random access procedure, an uplink transmission resource allocated by the network device, the communication module may send the RLC status report to the network device based on the second uplink transmission resource, and stop performing the random access procedure.

In one embodiment, the RRC message includes at least one of the following messages: an RRC reestablishment message, or an RRC reestablishment message and an RRC reconfiguration message, or an RRC resume message.

According to a fourth aspect, a communication system is provided. The communication system may include the communication apparatus described in the third aspect, and the communication apparatus may be configured to perform the method described in any one of the first aspect or the embodiments of the first aspect, or configured to perform the method described in any one of the second aspect or the embodiments of the second aspect.

According to a fifth aspect, a computer-readable storage medium is provided. The computer-readable storage medium stores instructions, and when the instructions are run on a computer, the computer is enabled to perform the method described in any one of the first aspect or the embodiments of the first aspect, or configured to perform the method described in any one of the second aspect or the embodiments of the second aspect.

According to a sixth aspect, a computer program product including instructions is provided. When the computer program product runs on a computer, the computer is enabled to perform the method described in any one of the first aspect or the embodiments of the first aspect, or configured to perform the method described in any one of the second aspect or the embodiments of the second aspect.

According to a seventh aspect, an embodiment of this application provides a chip system. The chip system includes a processor, and may further include a memory, configured to perform the method described in any one of the first aspect or the embodiments of the first aspect, or configured to perform the method described in any one of the second aspect or the embodiments of the second aspect. The chip system may include a chip, or may include a chip and another discrete component.

For beneficial effects of the second aspect to the thirteenth aspect and the embodiments thereof, refer to the descriptions of the beneficial effects of the method according to the first aspect and the embodiments thereof, or the method according to the second aspect and the embodiments thereof.

DESCRIPTION OF EMBODIMENTS

Figure 1:
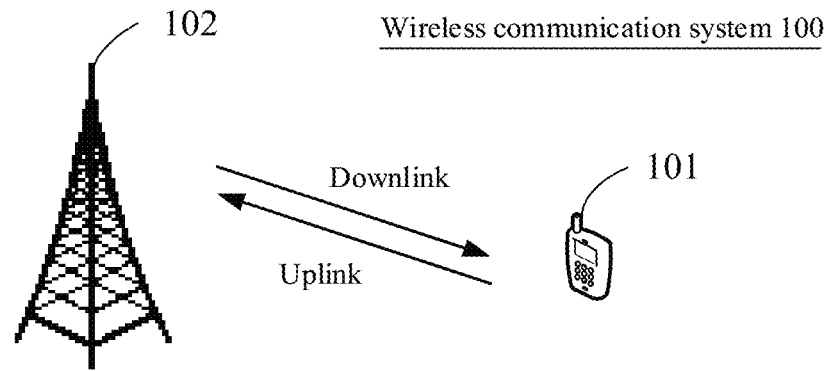
FIG. 1 is a schematic architectural diagram of a wireless communication system according to this application.

To make the objectives, technical solutions, and advantages of this application clearer, the following further describes this application in detail with reference to the accompanying drawings. A operation method in a method embodiment may also be applied to an apparatus embodiment or a system embodiment.

The following explains terms in this application.

At least one means one or more, that is, including one, two, three, or more.

A plurality of means two or more, that is, including two, three, or more.

Carrying may mean that a message is used to carry information or data, or may mean that a message includes information.

RRC connection reestablishment may also be referred to as RRC reestablishment or RRC reconnection. Before initiating the RRC connection reestablishment, a terminal device may obtain an uplink grant through a random access procedure, and the uplink grant is used to send an RRC connection reestablishment request. In addition, after the terminal device receives an RRC reestablishment message, an RRC reconfiguration message, or an RRC resume message that is sent by a base station, the terminal device determines, based on a polling bit in the RRC reestablishment message, the RRC reconfiguration message, or the RRC resume message, to send a radio link layer control protocol (RLC) status report to the base station. The polling bit is set to be in an active state by the base station (for example, when the polling bit is set to 1, it indicates that the polling bit is in the active state, and it indicates that the terminal device needs to feed back the RLC status report). In this case, to send the RLC status report, the terminal device still obtains an uplink grant through the random access procedure. Therefore, currently, in an RRC connection reestablishment process, the terminal device initiates two times of random access.

In this application, an RRC message includes the RRC reestablishment message, the RRC reconfiguration message, or the RRC resume message. Alternatively, the RRC message may include the RRC reestablishment message and the RRC reconfiguration message.

A signaling channel may also be referred to as a signaling radio bearer (SRB), and is a transmission channel of control signaling. A network device may send signaling such as the RRC message to the terminal device through the signaling channel. At least one signaling channel may be maintained between the network device and the terminal device, and a plurality of signaling channels may also be maintained between the network device and the terminal device.

In this application, a polling bit is a bit in a header of an RLC protocol data unit (PDU) when the network device sends the RRC message to the terminal device through RLC. When the bit is set to be in an active state, the terminal device receiving the RRC message needs to feed back the RLC status report to the network device. On the contrary, when the polling bit is set to be in an inactive state, the terminal device does not feed back the RLC status report to the network device after receiving the RRC message.

In the operation[KE3] shown in S102, if a value is set to 1, it indicates that the polling bit is in the active state, and a DU 202 may set a polling bit of an RLC PDU carrying the RRC message to 0 when sending the RRC message.

The following describes the embodiments of this application in detail with reference to the accompanying drawings. First, a wireless communication system provided in the embodiments of this application is described. An RRC message sending method provided in this application may be applied to the system. Then, the RRC message sending method provided in the embodiments of this application is described. Finally, an apparatus provided in the embodiments of this application is described.

As shown in FIG. 1, a wireless communication system 100 provided in an embodiment of this application may include a terminal device 101 and a network device 102. It should be understood that the wireless communication system 100 provided in this embodiment of this application is applicable to both a low-frequency scenario (sub 6G) and a high-frequency scenario (above 6G). An application scenario of the wireless communication system 100 provided in this embodiment of this application includes but is not limited to: a global system for mobile communications (GSM) system, a code division multiple access (CDMA) system, a wideband code division multiple access (WCDMA) system, a general packet radio service system (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communication system, a future 5th generation (5G) system, an NR communication system, or the like.

The terminal device 101 shown above may be a device such as user equipment (UE), a terminal, a mobile station (MS), or a mobile terminal. The terminal device 101 can communicate with one or more network devices of one or more communication systems, and accepts a network service provided by a network device. The network device herein includes but is not limited to the network device 102 shown in the figure. For example, in this embodiment of this application, the terminal device 101 may be a mobile phone (which is also referred to as a "cellular" phone) or a computer having a mobile terminal. Alternatively, the terminal device 101 may be a portable, pocket-sized, handheld, computer built-in, or in-vehicle mobile apparatus. Alternatively, the terminal device 101 may be a communication chip having a communication module.

The network device 102 may include a base station (BS), or include a base station, a radio resource management device configured to control the base station, and the like. The network device 102 may be a relay station (relay device), an access point, a vehicle-mounted device, a wearable device, a base station in a future 5G network, a base station in a future evolved public land mobile network (PLMN), an NR base station, or the like. This is not limited in this embodiment of this application.

Figure 2:
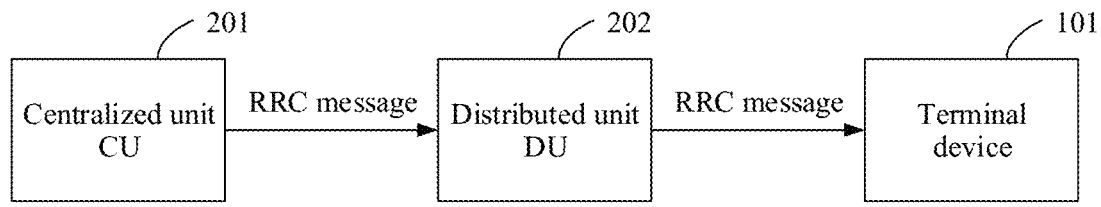
FIG. 2 is a schematic architectural diagram of a wireless communication system according to this application.

As shown in FIG. 2, another wireless communication system provided in this application may include a centralized unit (CU) 201 and a distributed unit (DU) 202. The CU 201 may include a packet data convergence protocol (PDCP) layer and an RRC layer. The DU 202 may include an RLC layer, a media access control (MAC) layer, and a port physical layer (PHY). In an RRC reestablishment process, the CU 201 may be configured to generate an RRC message that needs to be sent to a terminal device 101, and send the RRC message to the RLC layer of the DU 202. The DU 202 sends the RRC message to the terminal device 101 through the RLC layer. Because the DU 202 has a function of the RLC layer, when a polling bit in a header of an RLC PDU sent by the DU 202 to the terminal device 101 is set to be in an active state, the terminal device 101 sends an RLC status report to the DU 202 after receiving the RLC PDU.

It should be understood that the CU 201 and/or the DU 202 may be used as components/a component of the network device 102 shown in FIG. 1. Alternatively, the CU 201 and/or the DU 202 may be used as communication apparatuses/a communication apparatus independent of the network device 102.

Figure 3:
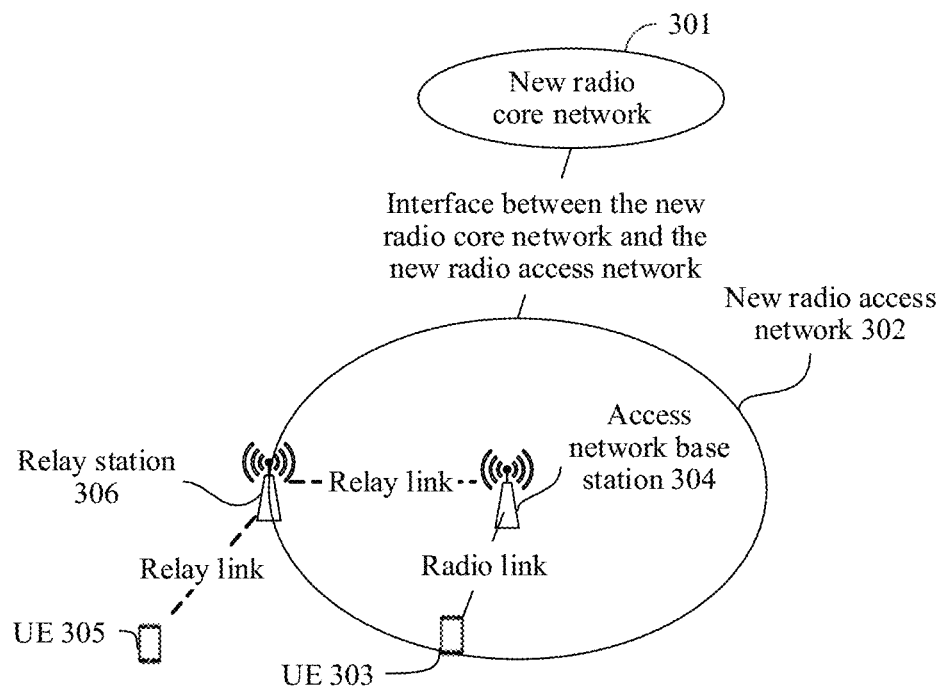
FIG. 3 is a schematic architectural diagram of a wireless communication system in an NR scenario according to this application.

The wireless communication system 100 may be applied to an NR scenario. As shown in FIG. 3, an example NR scenario may include an NR core network 301. The NR scenario may further include a new radio access network 302, and the NR core network 301 interacts with the new radio access network 302 through an interface. In the NR scenario, a function entity configured to implement the communication method in an embodiment of this application may be a CU, a DU, and/or a terminal device (for example, UE). In one embodiment, a terminal device 101 in this embodiment of this application may include a terminal device connected to a base station of the new radio access network 302, for example, UE 303 shown in FIG. 3. The UE 303 is connected to an access network base station 304 through a radio link. The access network base station 304 may be a base station in the new radio access network 302. The terminal device 101 in this embodiment of this application may further include UE connected to a relay station, for example, UE 305 shown in FIG. 3. The UE 305 is connected to a relay station 306, and the relay station 306 is connected to the access network base station 304 through a relay link. The network device 102 shown in FIG. 1 may be the access network base station 304 in the new radio access network 302 shown in FIG. 3, or may be the relay station 306 connected to the access network base station 304 shown in FIG. 3. The access network base station 304 is used as an example. A CU and/or a DU in this application may be used as components/a component of the access network base station 304. Alternatively, the CU and/or the DU may be communication apparatuses/a communication apparatus independent of the access network base station 304. The CU and/or the DU may communicate with the UE 303 through the access network base station 304, to implement the method provided in this embodiment of this application. Similarly, the CU and/or the DU may be used as components/a component of the relay station 306, or independent of the relay station 306

Figure 4:
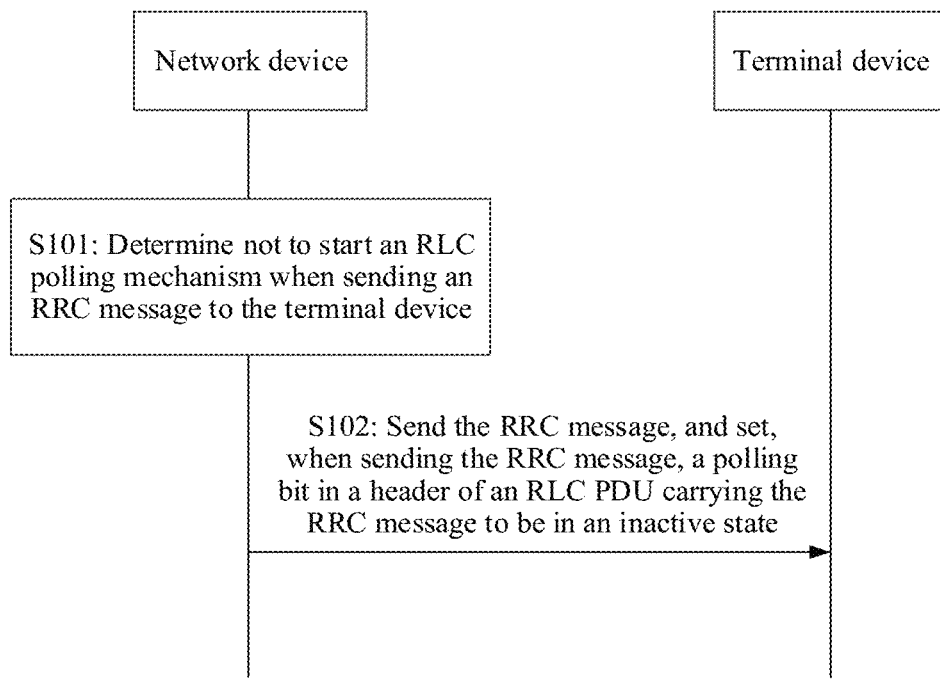
FIG. 4 is a schematic flowchart of an RRC message sending method according to this application.

With reference to FIG. 4, the following describes a communication method provided in an embodiment of this application by using the wireless communication system shown in FIG. 2 as an example. The method may include the following operations.

Operation S101: A DU 202 determines not to start an RLC polling mechanism when sending an RRC message to a terminal device 101.

The RRC message is sent by using a first signaling bearer, and the first signaling bearer may be sent in an RLC acknowledged mode (AM).

Operation S102: When sending the RRC message to the terminal device 101, the DU 202 sets a polling bit in a header of an RLC protocol data unit (PDU) carrying the RRC message to be in an inactive state.

In one embodiment, during implementation of operation S102, that the polling bit in the header of the RLC PDU is set to be in the inactive state may mean that a polling bit value of the header of the RLC PDU is set to 0.

In a conventional technology, when the RRC message is sent by using an RLC AM signaling bearer, a polling bit of a last RLC PDU carrying the RRC message is set to be in an active state. As a result, a terminal needs to feed back a status report of an RLC layer. According to the foregoing method, after receiving the RRC message, a terminal device may determine, based on the polling bit of the RLC PDU carrying the RRC message, that an RLC status report does not need to be fed back to the DU, and the terminal device does not need to perform random access to obtain an uplink grant for sending the RLC status report, thereby saving RACH resources.

In one embodiment, the DU 202 may determine, based on the RRC message, not to start the RLC polling mechanism when sending the RRC message to the terminal device 101. During implementation, if the RRC message is the first RRC message sent by the DU 202 to the terminal device 101 through a first signaling channel, the DU 202 determines not to start the RLC polling mechanism when sending the RRC message to the terminal device 101. The first signaling channel is sent in the RLC AM mode. Further, the DU may determine, based on that the RRC message is the first RRC message after a message 3 is received, not to start the RLC polling mechanism when sending the RRC message to the terminal device 101.

Figure 5:
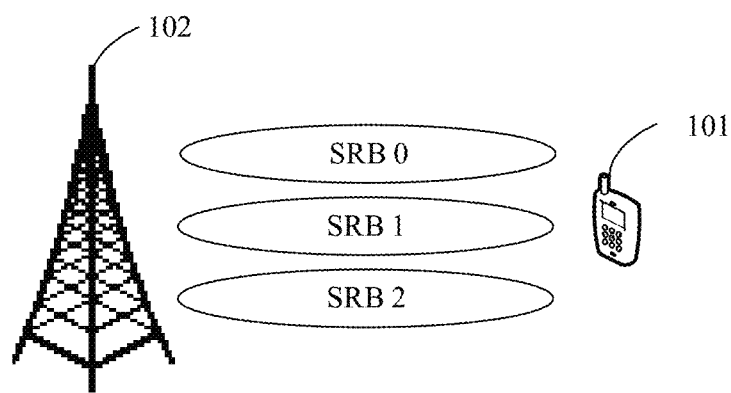
FIG. 5 is a schematic diagram of a signaling channel according to this application.

As shown in FIG. 5, signaling channels SRB 0, SRB 1, and SRB 2 are maintained between a DU 202 and a terminal device 101. If the DU 202 determines that an RRC message needs to be sent to the terminal device 101, and the RRC message is the first RRC message sent through the SRB 1, the DU 202 determines not to start an RLC polling mechanism when sending the RRC message through the SRB 1. In addition, the DU 202 may further determine not to start the RLC polling mechanism when sending the first RRC message through the SRB 2. In the foregoing solution, after the signaling channel between the DU 202 and the terminal device 101 is resumed through an RRC reestablishment process, the DU 202 may not start the RLC polling mechanism when sending the first RRC message through the signaling channel. Therefore, the terminal device 101 can be prevented from requesting an uplink grant through random access after receiving the RRC message, to save random access channel resources.

In one embodiment, the DU 202 may further determine, based on an indication of a CU 201, not to start the RLC polling mechanism when sending the RRC message to the terminal device 101.

During implementation, the CU 201 may generate first information, and the first information may be used to indicate the DU 202 not to start the RLC polling mechanism when the DU 202 sends the RRC message to the terminal device 101. The CU 201 may include the first message in a downlink RRC transmission (down link RRC message transfer) message or a terminal context setup request (UE context setup request) message that is sent to the DU 202. The CU 201 may further send, through a same message, the RRC message that needs to be sent to the terminal device 101 and first information particular to the RRC message to the DU 202. For example, the CU 201 sends, through a downlink RRC transmission message, the RRC message that needs to be sent to the terminal device 101 and the first information particular to the RRC message to the DU 202. Alternatively, the CU 201 sends, through a terminal context setup request message, the RRC message that needs to be sent to the terminal device 101 and the first information particular to the RRC message to the DU 202.

The first information may be used to indicate the DU 202 to set, when the DU 202 sends the RRC message to the terminal device 101, a polling bit in a header of an RLC PDU carrying the RRC message to be in an inactive state. Alternatively, the first information may be used to indicate the DU 202 not to trigger polling when the DU 202 sends the RRC message. A form of the first information is not limited in this application, and the first information may be a particular field and/or a value of a particular bit. In one embodiment, that the polling bit in the header of the RLC PDU is set to be in the inactive state means that a polling bit value of the header of the RLC PDU is set to 0. After receiving the first information, the DU 202 may determine not to start the RLC polling mechanism when sending the RRC message to the terminal device 101. Therefore, when sending the RRC message, the DU 202 may set the polling bit of the RLC PDU carrying the RRC message to be in the inactive state. For example, the polling bit is in an active state when the polling bit is set to 1. After receiving the first information, the DU 202 may set the polling bit of the RLC PDU carrying the RRC message to 0 when sending the RRC message. Therefore, the terminal device 101 may determine, based on the polling bit, that an RLC status report does not need to be fed back to the DU 202, and the terminal device 101 does not need to initiate random access to request an uplink grant for the RLC status report.

Figure 6:
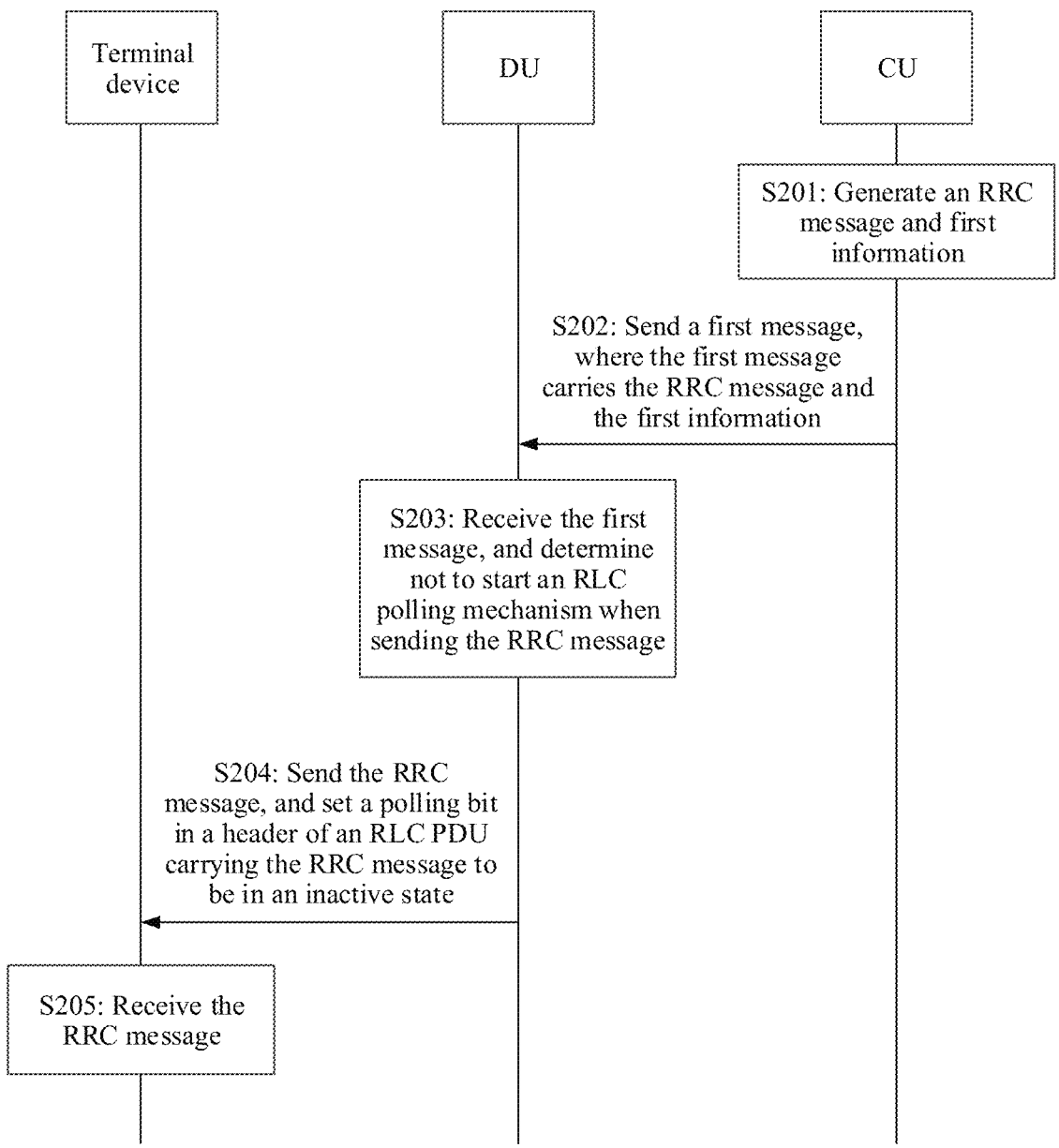
FIG. 6 is a schematic flowchart of another RRC message sending method according to this application.

As shown in FIG. 6, still using the wireless communication system shown in FIG. 2 as an example, an RRC message sending method provided in an embodiment of this application includes the following operations.

S201: A CU 201 generates an RRC message and first information. The RRC message may be an RRC reestablishment message. Alternatively, the RRC message may be an RRC reestablishment message and an RRC reconfiguration message. Alternatively, the RRC message may be an RRC resume message. The first information is used to indicate a DU 202 not to start an RLC polling mechanism when the DU 202 sends the RRC message to a terminal device 101.

S202: The CU 201 sends a first message to the DU 202, where the first message carries the RRC message and the first information. The first message may be a downlink RRC transmission message. Alternatively, the first message may be a terminal context setup request message.

S203: The DU 202 receives the first message, and determines, based on the first information in the first message, not to start the RLC polling mechanism when sending the RRC message.

S204: The DU 202 sends the RRC message to the terminal device 101, and sets a polling bit in a header of an RLC PDU carrying the RRC message to be in an inactive state. If the polling bit is 1, it indicates that the polling bit is in an active state. In this case, the DU 202 may set the polling bit to 0. The DU 202 may further indicate an SR resource when sending the RRC message to the terminal device 101, where the SR resource may be used by the terminal device 101 to request an uplink grant. The DU 202 may obtain the SR resource from the CU 201 or a network device to which the DU 202 belongs.

S205: The terminal device 101 receives the RRC message. Because the polling bit in the header of the RLC PDU carrying the RRC message is set to be in the inactive state, the terminal device 101 does not send an RLC status report to the DU 202. Then, the terminal device 101 may send an RRC reestablishment complete message or an RRC reconfiguration complete message to the DU 202 based on the RRC message. The terminal device 101 may further request an uplink grant based on the SR resource indicated by the DU 202.

Figure 7:
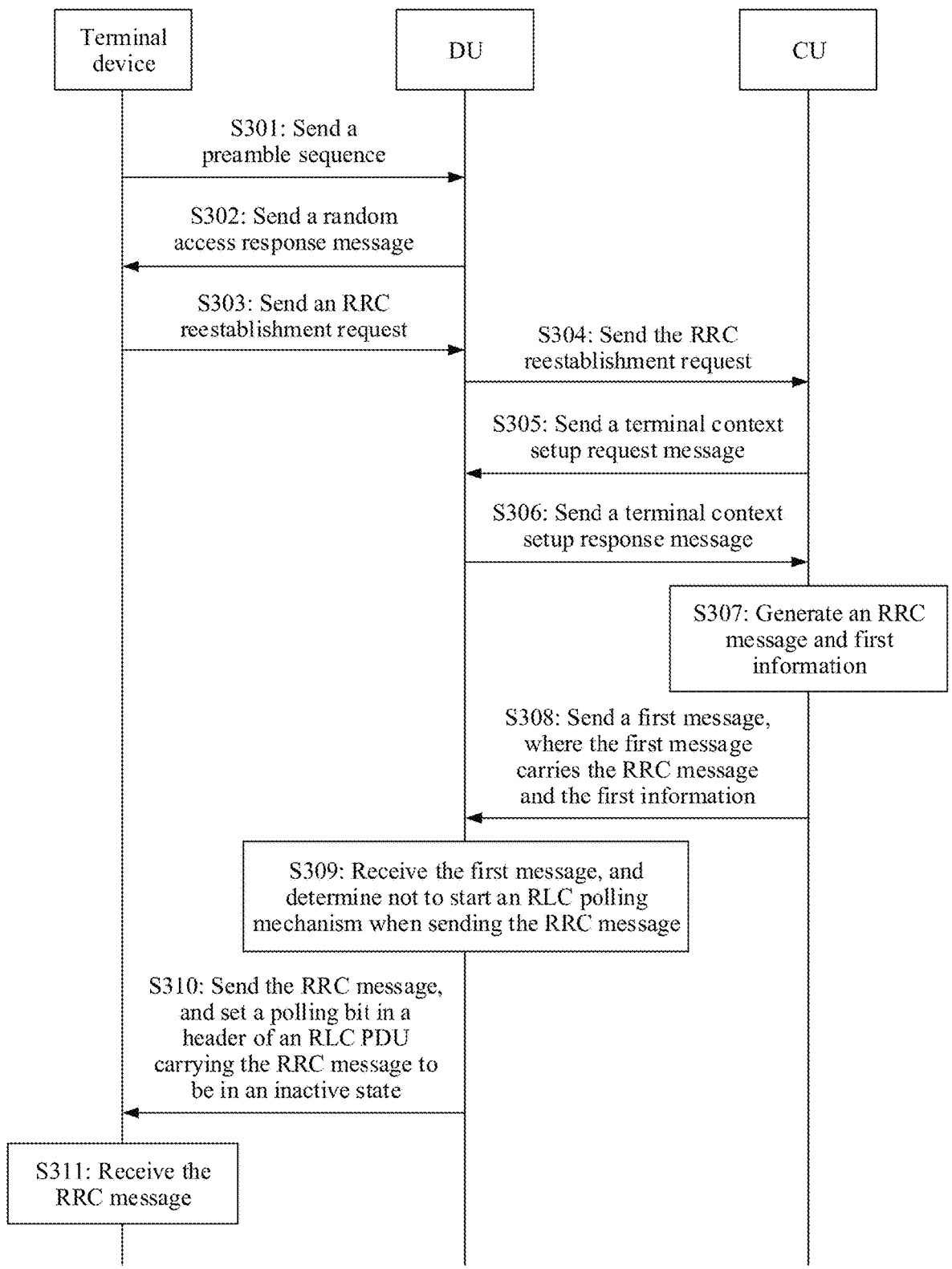
FIG. 7 is a schematic flowchart of another RRC message sending method according to this application.

As shown in FIG. 7, still using the wireless communication system shown in FIG. 2 as an example, another RRC message sending method provided in an embodiment of this application includes the following operations.

S301: A terminal device 101 sends a preamble sequence (random access preamble) to a DU 202. The preamble sequence is sent through a random access channel, and is used to request to initiate a random access procedure.

S302: After receiving the preamble sequence, the DU 202 sends a random access response message to the terminal device 101. The random access response message may carry uplink grant information, and the information may be used to indicate an uplink transmission resource allocated to the terminal device 101. For example, the uplink grant information may include a preamble sequence number, timing adjustment information, location information of the uplink transmission resource allocated to the terminal device 101, and a temporary cell radio network temporary identifier (TC-RNTI) temporarily allocated to the terminal device 101.

S303: The terminal device 101 sends an RRC reestablishment request to the DU 202 based on the uplink transmission resource indicated by the DU 202.

S304: After receiving the RRC reestablishment request, the DU 202 sends the RRC reestablishment request to a CU 201. The DU 202 may send the RRC reestablishment request to the CU 201 through an initial uplink RRC transmission (initial uplink RRC message transfer) message.

In addition, if preamble sequences sent by a plurality of terminal devices to the DU 202 in S301 are the same, the plurality of terminal devices simultaneously send RRC reestablishment requests in the operation shown in S303, but the DU 202 can receive only one RRC reestablishment request based on the preamble sequence. In this case, the DU 202 may further intercept the first X bits of received uplink data, and schedule, by using the TC-RNTI, data of X bits to the terminal devices that send the RRC reestablishment requests. If the data of the X bits received by a terminal device is the same as data of the first X bits of the sent RRC reestablishment request, it indicates that the terminal device is a terminal device that successfully performs access, and other terminal devices fail to perform access.

S305: After receiving the RRC reestablishment request, the CU 201 sends a terminal context setup request message to the DU 202, to request the DU 202 to set up a context of the terminal device 101.

S306: The DU 202 sends a terminal context setup response (UE context setup response) message to the CU 201 based on the terminal context setup request, to indicate a context setup result of the terminal device 101.

S307: After receiving the terminal context setup response message, the CU 201 generates an RRC message and first information. The RRC message may be an RRC reestablishment message. Alternatively, the RRC message may include an RRC reestablishment message and an RRC reconfiguration message. Alternatively, the RRC message may be an RRC resume message. The first information may indicate the DU 202 not to start an RLC polling mechanism when the DU 202 sends the RRC message. The CU 201 may include the RRC message and/or a first message in a same downlink RRC transmission message or a same terminal context setup request message, and send the RRC message and/or the first message to the DU 202. In addition, the CU 201 may separately send the RRC message and/or the first message to the DU 202 through a plurality of messages. For example, the RRC message includes the RRC reestablishment message and the RRC reconfiguration message. The CU 201 may include the RRC reestablishment message and the RRC reconfiguration message in a plurality of downlink RRC transmission messages, and separately send the plurality of downlink RRC transmission messages to the DU 202.

S308: The CU 201 sends the first message to the DU 202, where the first message may carry the RRC message and the first information.

S309: After receiving the first message, the DU 202 determines, based on the first information, not to start the RLC polling mechanism when sending the RRC message.

S310: The DU 202 sends the RRC message to the terminal device 101, and sets a polling bit in a header of an RLC PDU carrying the RRC message to be in an inactive state. If the polling bit is 1, it indicates that the polling bit is in an active state. In this case, the DU 202 may set the polling bit to 0. The DU 202 may further indicate an SR resource when sending the RRC message to the terminal device 101, where the SR resource may be used by the terminal device 101 to request an uplink grant.

S311: The terminal device 101 receives the RRC message. Because the polling bit in the header of the RLC PDU carrying the RRC message is set to be in the inactive state, the terminal device 101 does not send an RLC status report to the DU 202. Then, the terminal device 101 may send an RRC reestablishment complete message or an RRC reconfiguration complete message to the DU 202 based on the RRC message. The terminal device 101 may further request an uplink grant based on the SR resource indicated by the DU 202.

Figure 8:
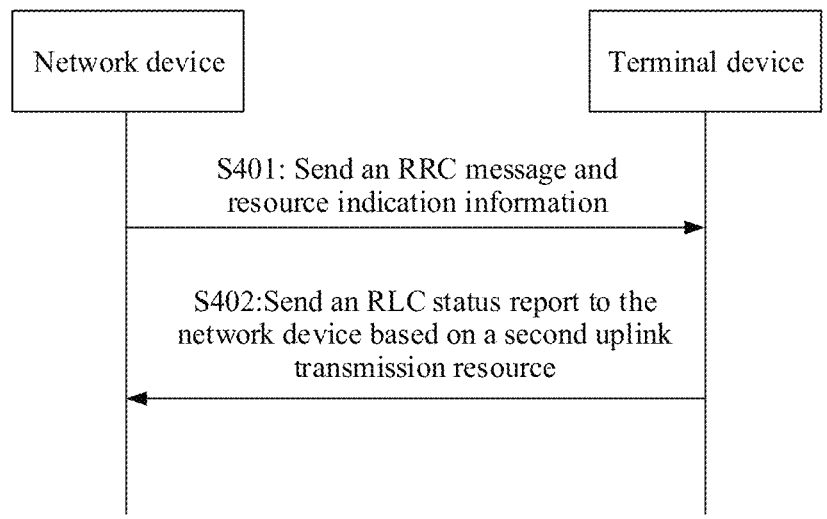
FIG. 8 is a schematic flowchart of another RRC message sending method according to this application.

As shown in FIG. 8, an embodiment of this application further provides a feedback information sending method. The method may be applied to the communication system shown in FIG. 1. The method may include the following operations.

S401: A terminal device 101 receives an RRC message and a resource indication that are sent by a network device 102, where a polling bit in a header of an RLC PDU carrying the RRC message is set to be in an active state, and the resource indication is used to indicate a first uplink transmission resource.

S402: The terminal device 101 sends an RLC status report to the network device 102 based on a second uplink transmission resource, where the second uplink transmission resource is a transmission resource that the terminal device 101 requests, based on the first uplink transmission resource, the network device 102 to allocate.

According to the foregoing method, after receiving the RRC message, the terminal device 101 no longer needs to obtain an uplink transmission resource through a random access procedure to send the RLC status report to the network device 102 based on the uplink transmission resource. Therefore, a quantity of times of random access performed in an RRC reestablishment process can be reduced, thereby saving random access channel resources.

It should be understood that the RRC message herein may include an RRC reestablishment message. Alternatively, the RRC message may include an RRC reestablishment message and an RRC reconfiguration message. Alternatively, the RRC message may be an RRC resume message.

In one embodiment, if the RRC message in the operation shown in S401 is the first RRC message transmitted by the network device 102 through a signaling channel after the signaling channel is resumed, the terminal device 101 may trigger sending of the RLC status report after preset duration (for example, 10 ms) from a time point at which the terminal device 101 receives the RRC message. In this solution, after determining that the polling bit in the header of the RLC PDU carrying the RRC message is set to be in the active state, the terminal device 101 may determine that the RLC status report needs to be fed back to the network device 102. After the preset duration, the terminal device 101 triggers the sending of the RLC status report, and the terminal device 101 may continue to parse the resource indication by using the preset duration, so that the terminal device 101 may learn of the first uplink transmission resource indicated by using the resource indication. Therefore, after triggering the sending of the RLC status report, the terminal device 101 may request, from the network device 102 based on the first uplink transmission resource, the second uplink transmission resource used to transmit the RLC status report, without initiating a random access procedure.

In one embodiment, after determining that the RLC status report needs to be fed back to the network device 102, the terminal device 101 may trigger initiating of the random access procedure to the network device 102 to request to obtain an uplink transmission resource, but before the terminal device 101 obtains the uplink transmission resource allocated by the network device 102, if the terminal device 101 obtains the first uplink transmission resource through parsing, the terminal device 101 stops the random access procedure, and requests, from the network device 102 based on the first uplink transmission resource, the second uplink transmission resource used to transmit the RLC status report. Then, the terminal device 101 may send the RLC status report based on the second uplink transmission resource allocated by the network device 102.

In one embodiment, the foregoing operations performed by the network device 102 may also be performed by the DU 202 shown in FIG. 2. When the foregoing operations performed by the network device 102 are performed by the DU 202, the resource indication may be obtained by the DU 202 from a CU 201 or a network device to which the DU 202 belongs.

In the foregoing embodiments provided in this application, the methods provided in the embodiments of this application are separately described from perspectives of processing actions performed by the CU, the DU, the network device, and the terminal device, and interaction between the CU, the DU, and the terminal device. To implement functions in the methods provided in the embodiments of this application, the CU, the DU, and the terminal device may include a hardware structure and/or a software module, and implement the functions in a form of the hardware structure, the software module, or a combination of the hardware structure and the software module. Whether a function in the foregoing functions is performed by the hardware structure, the software module, or the combination of the hardware structure and the software module depends on particular applications and design constraints of the technical solutions.

Figure 9:
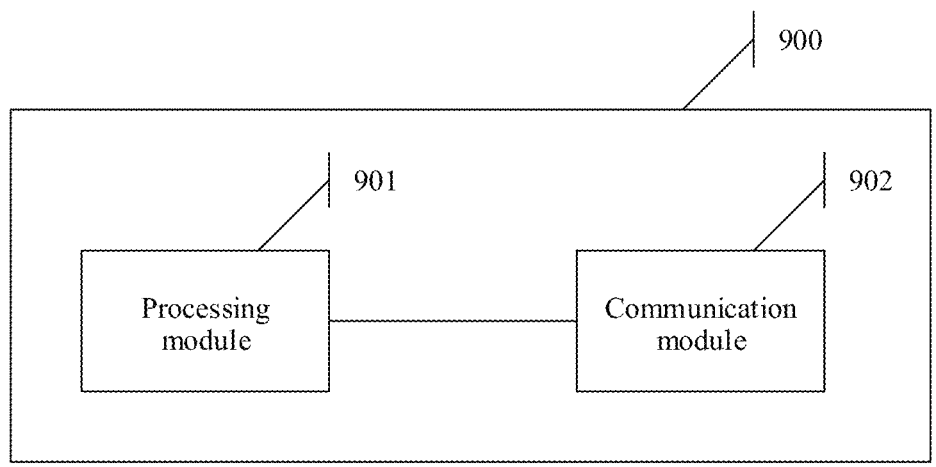
FIG. 9 is a schematic structural diagram of a communication apparatus according to this application.

FIG. 9 is a schematic structural diagram of a communication apparatus 900. The communication apparatus 900 may be a CU, and can implement a function of the CU in the methods provided in the embodiments of this application. The communication apparatus 900 may alternatively be an apparatus that can support the CU in implementing a function of the CU in the methods provided in the embodiments of this application. The communication apparatus 900 may be a hardware structure, a software module, or a combination of a hardware structure and a software module. The communication apparatus 900 may be implemented by a chip system. In this embodiment of this application, the chip system may include a chip, or may include a chip and another discrete component.

The communication apparatus 900 may include a processing module 901 and a communication module 902.

The processing module 901 may be configured to perform operation S201 in the embodiment shown in FIG. 6, and/or configured to support another process of the technology described in this specification. The communication module 902 is configured to perform communication between the communication apparatus 900 and another module (including receiving information and data sent by the another module, and sending information and data to the another module), and may be a circuit, a component, an interface, a bus, a software module, a transceiver, or any other apparatus that can implement communication.

The communication module 902 may be configured to perform operation S202 in the embodiment shown in FIG. 6, or configured to perform operations S301, S303, and S311 in the embodiment shown in FIG. 7, and/or configured to support another process of the technology described in this specification.

All related content of the operations in the foregoing method embodiments may be cited in function descriptions of corresponding functional modules. Details are not described herein again.

Figure 10:
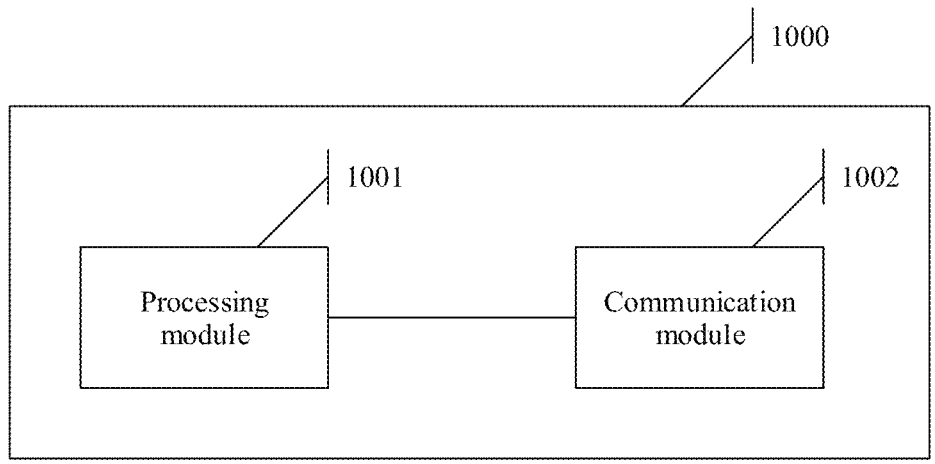
FIG. 10 is a schematic structural diagram of another communication apparatus according to this application.

FIG. 10 is a schematic structural diagram of a communication apparatus 1000. The communication apparatus 1000 may be a DU, and can implement a function of the DU in the methods provided in the embodiments of this application. The communication apparatus 1000 may alternatively be an apparatus that can support the DU in implementing a function of the DU in the methods provided in the embodiments of this application. The communication apparatus 1000 may be a hardware structure, a software module, or a combination of a hardware structure and a software module. The communication apparatus 1000 may be implemented by a chip system. In this embodiment of this application, the chip system may include a chip, or may include a chip and another discrete component.

The communication apparatus 1000 may include a processing module 1001 and a communication module 1002.

The processing module 1001 may be configured to perform operation S101 in the embodiment shown in FIG. 4, or configured to perform operation S203 in the embodiment shown in FIG. 6, or configured to perform operation S309 in the embodiment shown in FIG. 7, and/or configured to support another process of the technology described in this specification.

The communication module 1002 may be configured to perform operation S102 in the embodiment shown in FIG. 4, or configured to perform operation S204 in the embodiment shown in FIG. 6, or configured to perform operations S302, S304, S306, and S310 in the embodiment shown in FIG. 7, and/or configured to support another process of the technology described in this specification. The communication module 1002 is configured to perform communication between the communication apparatus 1000 and another module (including receiving information and data sent by the another module, and sending information and data to the another module), and may be a circuit, a component, an interface, a bus, a software module, a transceiver, or any other apparatus that can implement communication.

All related content of the operations in the foregoing method embodiments may be cited in function descriptions of corresponding functional modules. Details are not described herein again.

In the embodiments of this application, division into modules is an example, and is merely logical function division. During actual implementation, there may be another division manner. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 11:
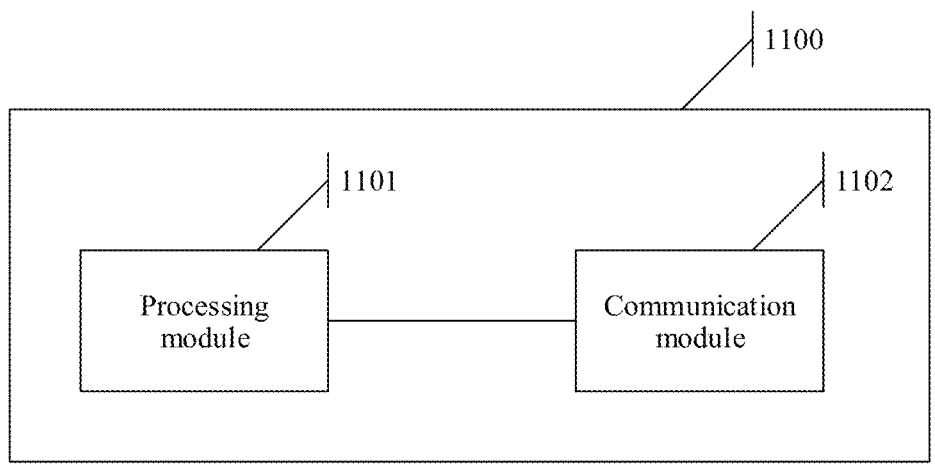
FIG. 11 is a schematic structural diagram of another communication apparatus according to this application.

In addition, FIG. 11 is a schematic structural diagram of a communication apparatus 1100. The communication apparatus 1100 may be a network device, and can implement a function of the network device in the methods provided in the embodiments of this application. The communication apparatus 1100 may alternatively be an apparatus that can support the network device in implementing a function of the network device in the methods provided in the embodiments of this application. The communication apparatus 1100 may be a hardware structure, a software module, or a combination of a hardware structure and a software module. The communication apparatus 1100 may be implemented by a chip system. In this embodiment of this application, the chip system may include a chip, or may include a chip and another discrete component.

The communication apparatus 1100 may include a processing module 1101 and a communication module 1102.

The processing module 1101 may be configured to generate an RRC message and a resource indication in operation S401 in the embodiment shown in FIG. 8, and/or configured to support another process of the technology described in this specification.

The communication module 1102 may be configured to perform operation S401 in the embodiment shown in FIG. 8, and/or configured to support another process of the technology described in this specification. The communication module 1102 is configured to perform communication between the communication apparatus 1100 and another module (including receiving information and data sent by the another module, and sending information and data to the another module), and may be a circuit, a component, an interface, a bus, a software module, a transceiver, or any other apparatus that can implement communication.

All related content of the operations in the foregoing method embodiments may be cited in function descriptions of corresponding functional modules. Details are not described herein again.

In the embodiments of this application, division into modules is an example, and is merely logical function division. During actual implementation, there may be another division manner. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 12:
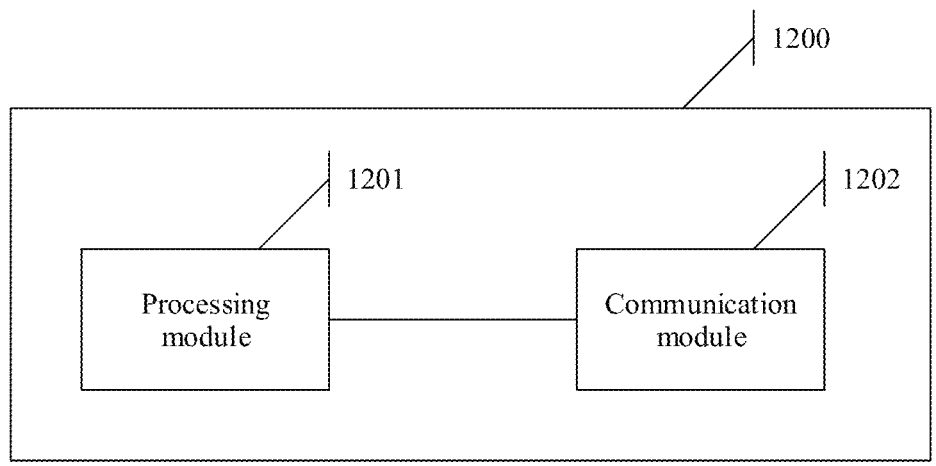
FIG. 12 is a schematic structural diagram of another communication apparatus according to this application.

FIG. 12 is a schematic structural diagram of a communication apparatus 1200. The communication apparatus 1200 may be a terminal device, and can implement a function of the terminal device in the methods provided in the embodiments of this application. The communication apparatus 1200 may alternatively be an apparatus that can support the terminal device in implementing a function of the terminal device in the methods provided in the embodiments of this application. The communication apparatus 1200 may be a hardware structure, a software module, or a combination of a hardware structure and a software module. The communication apparatus 1200 may be implemented by a chip system. In this embodiment of this application, the chip system may include a chip, or may include a chip and another discrete component.

The communication apparatus 1200 may include a processing module 1201 and a communication module 1202.

The processing module 1201 may be configured to determine, based on an RLC PDU sent by a DU, not to send an RLC status report to the DU, or configured to determine, based on an RLC PDU sent by a DU or a network device, to send an RLC status report to the DU or the network device on a control channel or a data channel, and/or configured to support another process of the technology described in this specification.

The communication module 1202 may be configured to perform operation S402 in the embodiment shown in FIG. 8, and/or configured to support another process of the technology described in this specification. The communication module 1202 is configured to perform communication between the communication apparatus 1200 and another module (including receiving information and data sent by the another module, and sending information and data to the another module), and may be a circuit, a component, an interface, a bus, a software module, a transceiver, or any other apparatus that can implement communication.

All related content of the operations in the foregoing method embodiments may be cited in function descriptions of corresponding functional modules. Details are not described herein again.

In the embodiments of this application, division into modules is an example, and is merely logical function division. During actual implementation, there may be another division manner. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 13:
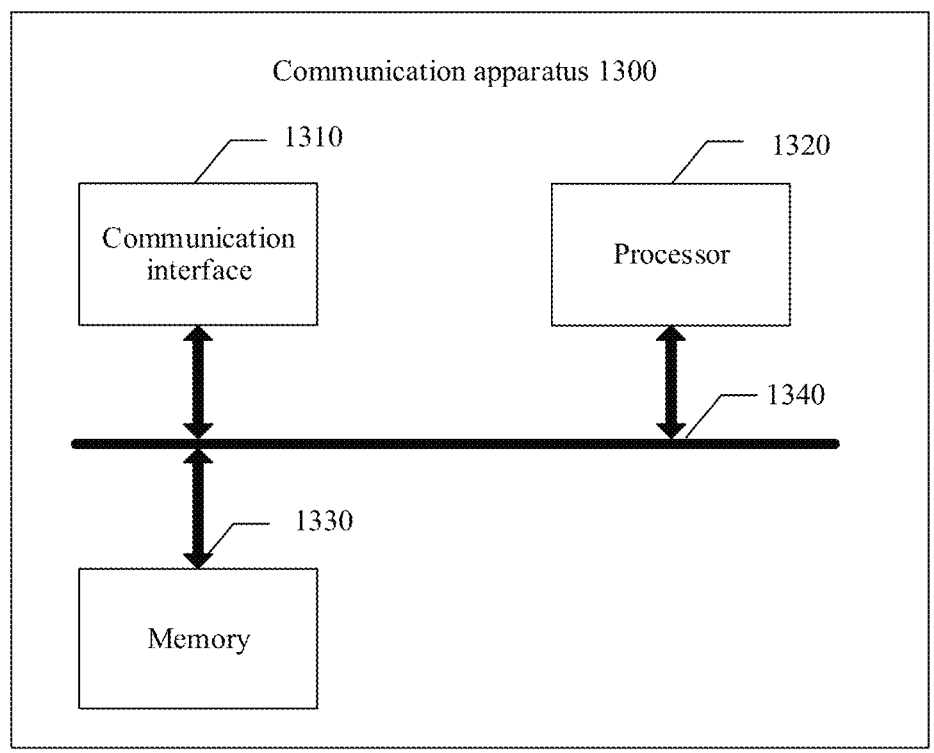
FIG. 13 is a schematic structural diagram of another communication apparatus according to this application.

FIG. 13 shows a communication apparatus 1300 provided in an embodiment of this application. The communication apparatus 1300 may be the CU in the embodiment shown in FIG. 6 or FIG. 7, and can implement a function of the CU in the methods provided in the embodiments of this application. The communication apparatus 1300 may alternatively be an apparatus that can support the CU in implementing a function of the CU in the methods provided in the embodiments of this application. The communication apparatus 1300 may be a chip system. In this embodiment of this application, the chip system may include a chip, or may include a chip and another discrete component.

The communication apparatus 1300 includes at least one processor 1320, configured to implement or support the communication apparatus 1300 in implementing the function of the CU in the methods provided in the embodiments of this application. For example, the processor 1320 may generate an RRC message and/or first information. For details, refer to the detailed descriptions in the method examples. Details are not described herein again. The processor 1320 may have a function of the processing module 901 shown in FIG. 9, and may perform any operation that can be performed by the processing module 901.

The communication apparatus 1300 may further include at least one memory 1330, configured to store program instructions and/or data. The memory 1330 is coupled to the processor 1320. Coupling in this embodiment of this application is indirect coupling or a communication connection between apparatuses, units, or modules, may be implemented in an electrical form, a mechanical form, or another form, and is used for information exchange between the apparatuses, the units, or the modules. The processor 1320 may cooperate with the memory 1330. The processor 1320 may execute the program instructions stored in the memory 1330. At least one of the at least one memory may be included in the processor.

The communication apparatus 1300 may further include a communication interface 1310, configured to communicate with another device through a transmission medium, so that an apparatus in the communication apparatus 1300 can communicate with the another device. For example, the another device may be a DU in this embodiment of this application, and the communication interface 1310 may be configured to send an RRC message and/or first information to the DU. The processor 1320 may send and receive data through the communication interface 1310. The communication interface 1310 may have a function of the communication module 902 shown in FIG. 9, and may perform any operation that can be performed by the communication module 902.

A connection medium between the communication interface 1310, the processor 1320, and the memory 1330 is not limited in this embodiment of this application. In this embodiment of this application, in FIG. 13, the memory 1330, the processor 1320, and the communication interface 1310 are connected through a bus 1340. The bus is represented by a thick line in FIG. 13. A connection manner between other components is merely described as an example, and is not limited thereto. The bus may be classified into an address bus, a data bus, a control bus, and the like. For ease of representation, only one thick line is used to represent the bus in FIG. 13, but this does not mean that there is only one bus or only one type of bus.

In this embodiment of this application, the processor 1320 may be a general purpose processor, a digital signal processor, an application-specific integrated circuit, a field programmable gate array or another programmable logic device, a discrete gate or a transistor logic device, or a discrete hardware component, and may implement or perform the methods, operations, and logical block diagrams disclosed in the embodiments of this application. The general purpose processor may be a microprocessor, any conventional processor, or the like. The operations in the methods disclosed with reference to the embodiments of this application may be directly performed and completed by a hardware processor, or may be performed and completed by using a combination of hardware and software modules in the processor.

In this embodiment of this application, the memory 1330 may be a non-volatile memory, such as a hard disk drive (HDD) or a solid-state drive (SSD), or may be a volatile memory (volatile memory), such as a random access memory (RAM). The memory is any other medium that can be used to carry or store expected program code in a form of instructions or a data structure and that can be accessed by a computer. However, this is not limited thereto. The memory in this embodiment of this application may alternatively be a circuit or any other apparatus that can implement a storage function, and is configured to store program instructions and/or data.

Figure 14:
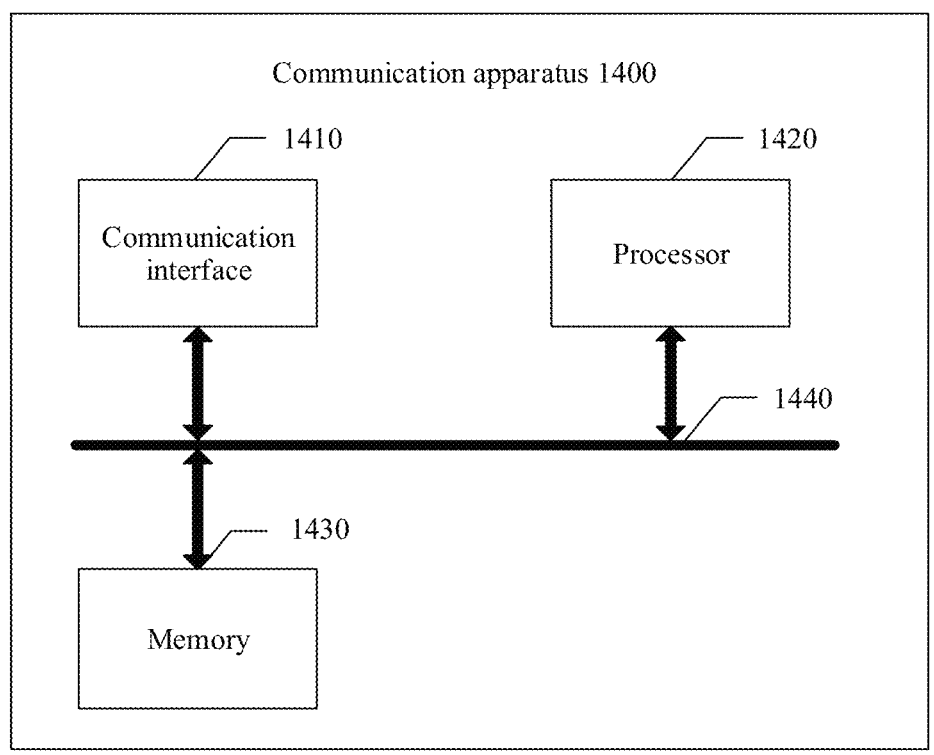
FIG. 14 is a schematic structural diagram of another communication apparatus according to this application.

FIG. 14 shows a communication apparatus 1400 provided an embodiment of this application. The communication apparatus 1400 may be a DU, and can implement a function of the DU in the methods provided in the embodiments of this application. The communication apparatus 1400 may alternatively be an apparatus that can support the DU in implementing a function of the DU in the methods provided in the embodiments of this application. The communication apparatus 1400 may be a chip system. In this embodiment of this application, the chip system may include a chip, or may include a chip and another discrete component.

The communication apparatus 1400 includes at least one processor 1420, configured to implement or support the communication apparatus 1400 in implementing the function of the DU in the methods provided in the embodiments of this application. For example, the processor 1420 may determine, based on first information, not to start an RLC polling mechanism when an RRC message is sent. For details, refer to the detailed descriptions in the method examples. Details are not described herein again. The processor 1420 may have a function of the processing module 1001 shown in FIG. 10, and may perform any operation that can be performed by the processing module 1001.

The communication apparatus 1400 may further include at least one memory 1430, configured to store program instructions and/or data. The memory 1430 is coupled to the processor 1420. Coupling in this embodiment of this application is indirect coupling or a communication connection between apparatuses, units, or modules, may be implemented in an electrical form, a mechanical form, or another form, and is used for information exchange between the apparatuses, the units, or the modules. The processor 1420 may cooperate with the memory 1430. The processor 1420 may execute the program instructions stored in the memory 1430. At least one of the at least one memory may be included in the processor.

The communication apparatus 1400 may further include a communication interface 1410, configured to communicate with another device through a transmission medium, so that an apparatus in the communication apparatus 1400 can communicate with the another device. For example, the another device may be a CU or a terminal device. The processor 1420 may send and receive data through the communication interface 1410. The communication interface 1410 may have a function of the communication module 1002 shown in FIG. 10, and may perform any operation that can be performed by the communication module 1002.

A connection medium between the communication interface 1410, the processor 1420, and the memory 1430 is not limited in this embodiment of this application. In this embodiment of this application, in FIG. 14, the memory 1430, the processor 1420, and the communication interface 1410 are connected through a bus 1440. The bus is represented by a thick line in FIG. 14. A connection manner between other components is merely described as an example, and is not limited thereto. The bus may be classified into an address bus, a data bus, a control bus, and the like. For ease of representation, only one thick line is used to represent the bus in FIG. 14, but this does not mean that there is only one bus or only one type of bus.

In this embodiment of this application, the processor 1420 may be a general purpose processor, a digital signal processor, an application-specific integrated circuit, a field programmable gate array or another programmable logic device, a discrete gate or a transistor logic device, or a discrete hardware component, and may implement or perform the methods, operations, and logical block diagrams disclosed in the embodiments of this application. The general purpose processor may be a microprocessor, any conventional processor, or the like. The operations in the methods disclosed with reference to the embodiments of this application may be directly performed and completed by a hardware processor, or may be performed and completed by using a combination of hardware and software modules in the processor.

In this embodiment of this application, the memory 1430 may be a non-volatile memory, such as a hard disk drive or a solid-state drive, or may be a volatile memory, such as a random access memory. The memory is any other medium that can be used to carry or store expected program code in a form of instructions or a data structure and that can be accessed by a computer. However, this is not limited thereto. The memory in this embodiment of this application may alternatively be a circuit or any other apparatus that can implement a storage function, and is configured to store program instructions and/or data.

Figure 15:
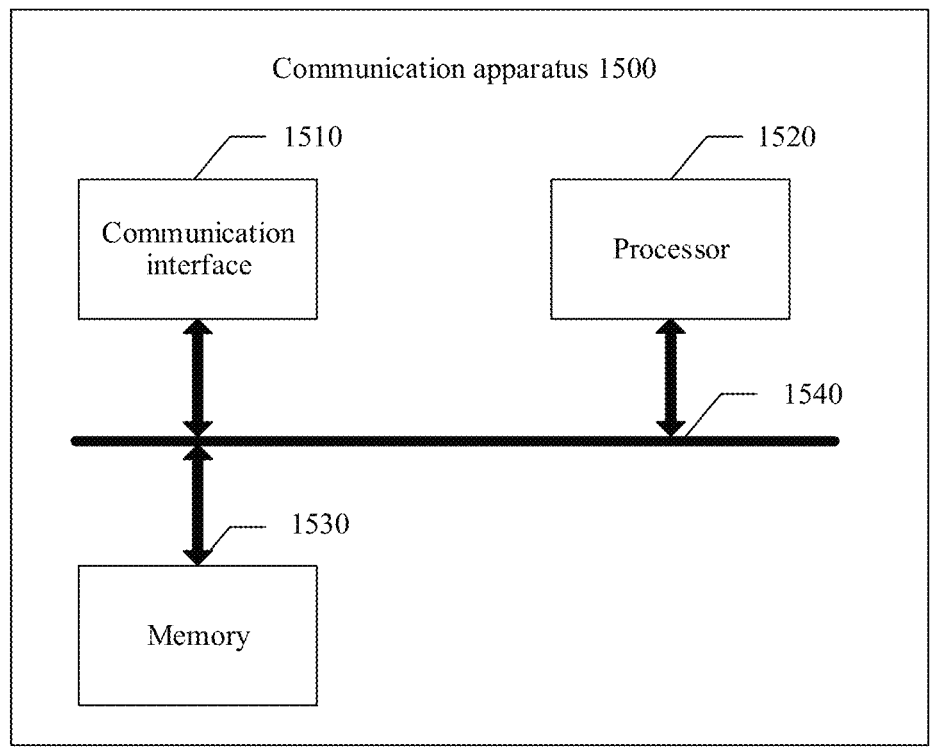
FIG. 15 is a schematic structural diagram of another communication apparatus according to this application.

FIG. 15 shows a communication apparatus 1500 provided in an embodiment of this application. The communication apparatus 1500 may be a network device, and can implement a function of the network device in the methods provided in the embodiments of this application. The communication apparatus 1500 may alternatively be an apparatus that can support the network device in implementing a function of the network device in the methods provided in the embodiments of this application. The communication apparatus 1500 may be a chip system. In this embodiment of this application, the chip system may include a chip, or may include a chip and another discrete component.

The communication apparatus 1500 includes at least one processor 1520, configured to implement or support the communication apparatus 1500 in implementing the function of the network device in the methods provided in the embodiments of this application. For example, the processor 1520 may generate an RRC message. For details, refer to the detailed descriptions in the method examples. Details are not described herein again. The processor 1520 may further have a function of the processing module 1101 shown in FIG. 11, and may perform any operation that can be performed by the processing module 1101.

The communication apparatus 1500 may further include at least one memory 1530, configured to store program instructions and/or data. The memory 1530 is coupled to the processor 1520. Coupling in this embodiment of this application is indirect coupling or a communication connection between apparatuses, units, or modules, may be implemented in an electrical form, a mechanical form, or another form, and is used for information exchange between the apparatuses, the units, or the modules. The processor 1520 may cooperate with the memory 1530. The processor 1520 may execute the program instructions stored in the memory 1530. At least one of the at least one memory may be included in the processor.

The communication apparatus 1500 may further include a communication interface 1510, configured to communicate with another device through a transmission medium, so that an apparatus in the communication apparatus 1500 can communicate with the another device. For example, the another device may be a terminal device. The processor 1520 may send and receive data through the communication interface 1510. The communication interface 1510 may have a function of the communication module 1102 shown in FIG. 11, and may perform any operation that can be performed by the communication module 1102.

A connection medium between the communication interface 1510, the processor 1520, and the memory 1530 is not limited in this embodiment of this application. In this embodiment of this application, in FIG. 15, the memory 1530, the processor 1520, and the communication interface 1510 are connected through a bus 1540. The bus is represented by a thick line in FIG. 15. A connection manner between other components is merely described as an example, and is not limited thereto. The bus may be classified into an address bus, a data bus, a control bus, and the like. For ease of representation, only one thick line is used to represent the bus in FIG. 15, but this does not mean that there is only one bus or only one type of bus.

In this embodiment of this application, the processor 1520 may be a general purpose processor, a digital signal processor, an application-specific integrated circuit, a field programmable gate array or another programmable logic device, a discrete gate or a transistor logic device, or a discrete hardware component, and may implement or perform the methods, operations, and logical block diagrams disclosed in the embodiments of this application. The general purpose processor may be a microprocessor, any conventional processor, or the like. The operations in the methods disclosed with reference to the embodiments of this application may be directly performed and completed by a hardware processor, or may be performed and completed by using a combination of hardware and software modules in the processor.

In this embodiment of this application, the memory 1530 may be a non-volatile memory, such as a hard disk drive or a solid-state drive, or may be a volatile memory, such as a random access memory. The memory is any other medium that can be used to carry or store expected program code in a form of instructions or a data structure and that can be accessed by a computer. However, this is not limited thereto. The memory in this embodiment of this application may alternatively be a circuit or any other apparatus that can implement a storage function, and is configured to store program instructions and/or data.

Figure 16:
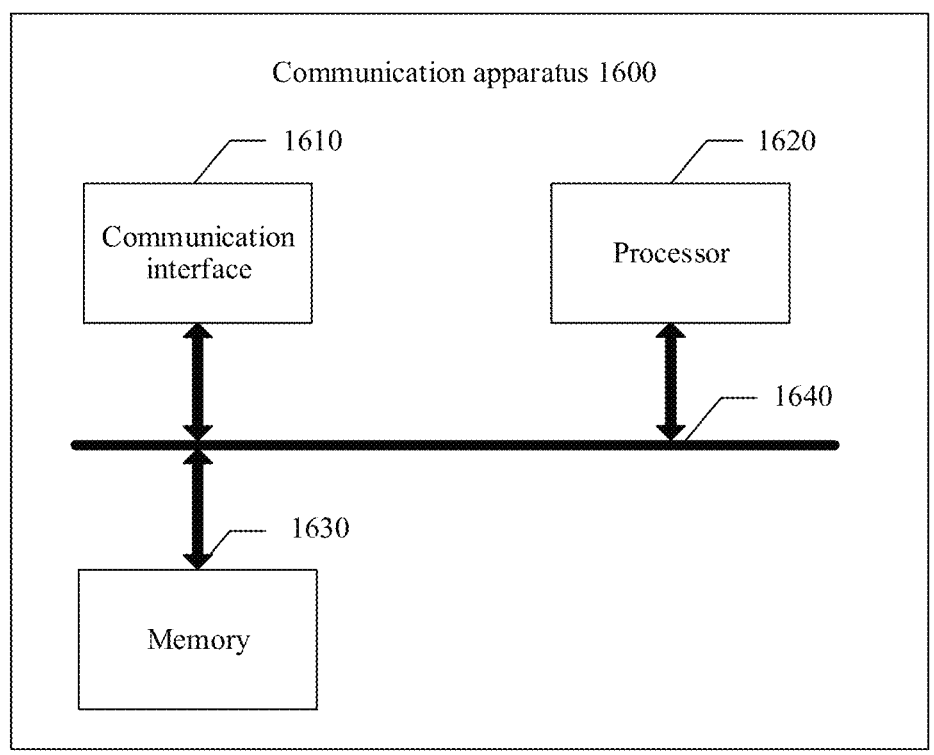
FIG. 16 is a schematic structural diagram of another communication apparatus according to this application.

FIG. 16 shows a communication apparatus 1600 provided in an embodiment of this application. The communication apparatus 1600 may be a terminal device, and can implement a function of the terminal device in the methods provided in the embodiments of this application. The communication apparatus 1600 may alternatively be an apparatus that can support the terminal device in implementing a function of the terminal device in the methods provided in the embodiments of this application. The communication apparatus 1600 may be a chip system. In this embodiment of this application, the chip system may include a chip, or may include a chip and another discrete component.

The communication apparatus 1600 includes at least one processor 1620, configured to implement or support the communication apparatus 1600 in implementing a function of the terminal device in the methods provided in the embodiments of this application. For example, the processor 1620 may be configured to determine, based on an RLC PDU sent by a DU, not to send an RLC status report to a network device, or configured to determine, based on an RLC PDU sent by a DU or a network device, to send an RLC status report to the DU or the network device on a control channel or a data channel. For details, refer to the detailed descriptions in the method examples. Details are not described herein again. The processor 1620 may further have a function of the processing module 1201 shown in FIG. 12, and may perform any operation that can be performed by the processing module 1201.

The communication apparatus 1600 may further include at least one memory 1630, configured to store program instructions and/or data. The memory 1630 is coupled to the processor 1620. Coupling in this embodiment of this application is indirect coupling or a communication connection between apparatuses, units, or modules, may be implemented in an electrical form, a mechanical form, or another form, and is used for information exchange between the apparatuses, the units, or the modules. The processor 1620 may cooperate with the memory 1630. The processor 1620 may execute the program instructions stored in the memory 1630. At least one of the at least one memory may be included in the processor.

The communication apparatus 1600 may further include a communication interface 1610, configured to communicate with another device through a transmission medium, so that an apparatus in the communication apparatus 1600 can communicate with the another device. For example, the another device may be a terminal device. The processor 1620 may send and receive data through the communication interface 1610. The communication interface 1610 may have a function of the communication module 1202 shown in FIG. 12, and may perform any operation that can be performed by the communication module 1202.

A connection medium between the communication interface 1610, the processor 1620, and the memory 1630 is not limited in this embodiment of this application. In this embodiment of this application, in FIG. 16, the memory 1630, the processor 1620, and the communication interface 1610 are connected through a bus 1640. The bus is represented by a thick line in FIG. 16. A connection manner between other components is merely described as an example, and is not limited thereto. The bus may be classified into an address bus, a data bus, a control bus, and the like. For ease of representation, only one thick line is used to represent the bus in FIG. 16, but this does not mean that there is only one bus or only one type of bus.

In this embodiment of this application, the processor 1620 may be a general purpose processor, a digital signal processor, an application-specific integrated circuit, a field programmable gate array or another programmable logic device, a discrete gate or a transistor logic device, or a discrete hardware component, and may implement or perform the methods, operations, and logical block diagrams disclosed in the embodiments of this application. The general purpose processor may be a microprocessor, any conventional processor, or the like. The operations in the methods disclosed with reference to the embodiments of this application may be directly performed and completed by a hardware processor, or may be performed and completed by using a combination of hardware and software modules in the processor.

In this embodiment of this application, the memory 1630 may be a non-volatile memory, such as a hard disk drive or a solid-state drive, or may be a volatile memory, such as a random access memory. The memory is any other medium that can be used to carry or store expected program code in a form of instructions or a data structure and that can be accessed by a computer. However, this is not limited thereto. The memory in this embodiment of this application may alternatively be a circuit or any other apparatus that can implement a storage function, and is configured to store program instructions and/or data.

An embodiment of this application further provides a communication apparatus, and the communication apparatus may be a terminal device or a circuit. The communication apparatus may be configured to perform an action performed by the terminal device in the foregoing method embodiments.

Figure 17:
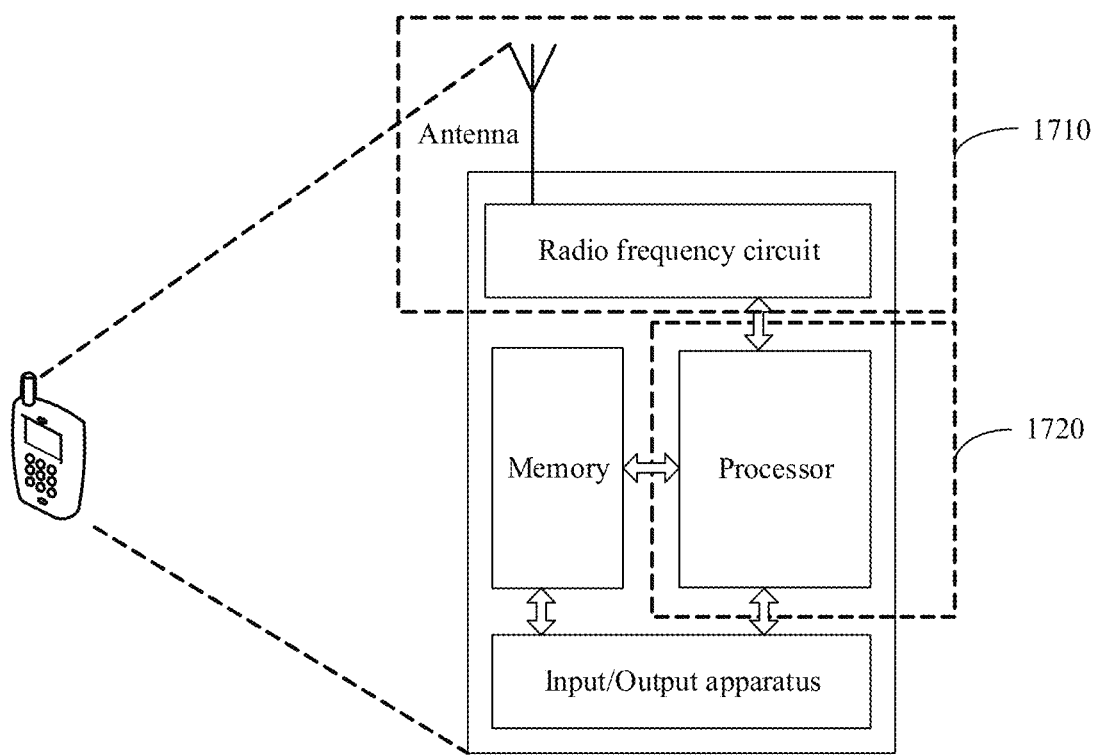
FIG. 17 is a schematic structural diagram of another communication apparatus according to this application.

When the communication apparatus is a terminal device, FIG. 17 is a simplified schematic structural diagram of the terminal device. For ease of understanding and illustration, an example in which the terminal device is a mobile phone is used in FIG. 17. As shown in FIG. 17, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus such as a touchscreen, a display, or a keyboard is mainly configured to: receive data entered by a user and output data to the user. It should be noted that some types of terminal devices may have no input/output apparatus.

When data needs to be sent, after performing baseband processing on the to-be-sent data, the processor outputs a baseband signal to the radio frequency circuit. After performing radio frequency processing on the baseband signal, the radio frequency circuit sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 17 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have sending and receiving functions may be considered as a transceiver unit of the terminal device, and the processor that has a processing function may be considered as a processing unit of the terminal device. As shown in FIG. 17, the terminal device includes a transceiver unit 1710 and a processing unit 1720. The transceiver unit may also be referred to as a transceiver, a transceiver machine, a transceiver apparatus, or the like. The processing unit may also be referred to as a processor, a processing board, a processing module, a processing apparatus, or the like. In one embodiment, a component for implementing a receiving function in the transceiver unit 1710 may be considered as a receiving unit, and a component for implementing a sending function in the transceiver unit 1710 may be considered as a sending unit. In other words, the transceiver unit 1710 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

It should be understood that the transceiver unit 1710 is configured to perform a sending operation and a receiving operation on the terminal device side in the foregoing method embodiments, and the processing unit 1720 is configured to perform an operation other than the sending operation and the receiving operation of the terminal device in the foregoing method embodiments.

For example, in one embodiment, the transceiver unit 1710 is configured to perform the RRC message receiving operation on the terminal device side in FIG. 4, and/or the transceiver unit 1710 is further configured to perform another sending operation and receiving operation on the terminal device side in the embodiments of this application. The processing unit 1720 is configured to determine, based on a polling bit in a header of an RLC PDU carrying an RRC message, not to send an RLC status report to a DU, and/or the processing unit 1720 is further configured to perform another processing operation on the terminal device side in the embodiments of this application.

For another example, in one embodiment, the transceiver unit 1710 is configured to perform the RRC message receiving operation on the terminal device side in FIG. 6, and/or the transceiver unit 1710 is further configured to perform another sending operation and receiving operation on the terminal device side in the embodiments of this application. The processing unit 1720 is configured to determine, based on a polling bit in a header of an RLC PDU carrying an RRC message, not to send an RLC status report to a DU, and/or the processing unit 1720 is further configured to perform another processing operation on the terminal device side in the embodiments of this application.

For still another example, in one embodiment, the transceiver unit 1710 is configured to receive the random access response message in operations S301, S303, S310, and operation S302 in FIG. 7, and/or the transceiver unit 1710 is further configured to perform another sending operation and receiving operation on the terminal device side in the embodiments of this application. The processing unit 1720 is configured to determine, based on a polling bit in a header of an RLC PDU carrying an RRC message, not to send an RLC status report to a DU, and/or the processing unit 1720 is further configured to perform another processing operation on the terminal device side in the embodiments of this application.

For still another example, in one embodiment, the transceiver unit 1710 is configured to: perform operation S402 and receive the RRC message and the resource indication in operation S401 in FIG. 8, and/or the transceiver unit 1710 is further configured to perform another sending operation and receiving operation on the terminal device side in the embodiments of this application. The processing unit 1720 is configured to determine to send an RLC status report to a network device on a control channel or a data channel, and/or the processing unit 1720 is further configured to perform another processing operation on the terminal device side in the embodiments of this application.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

Figure 18:
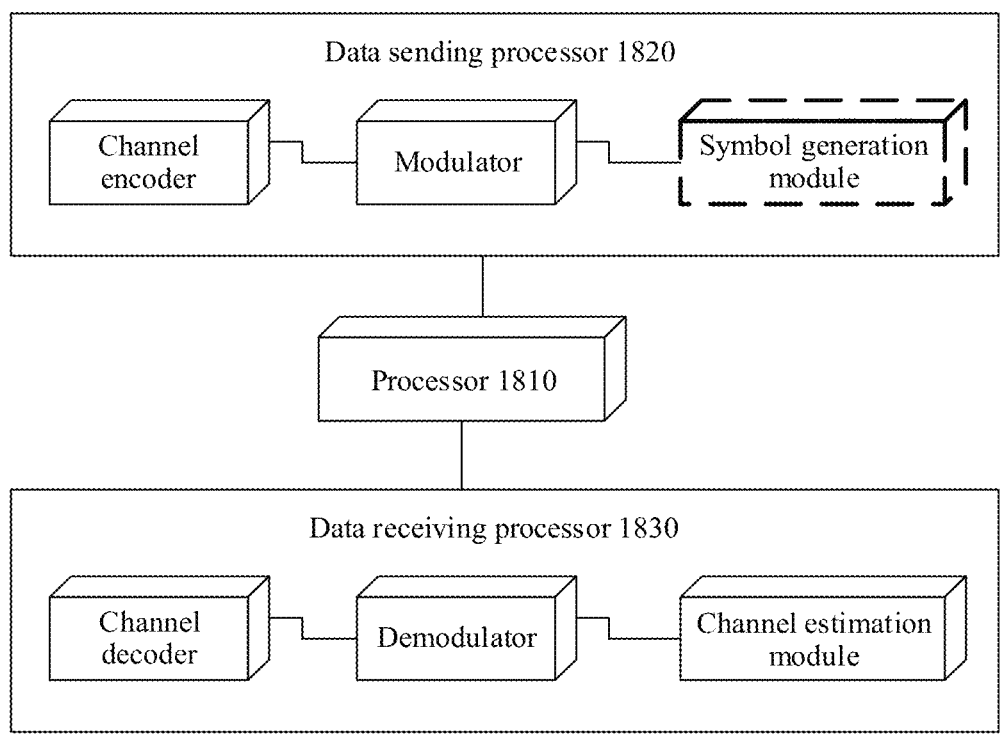
FIG. 18 is a schematic structural diagram of another communication apparatus according to this application.

When the communication apparatus in this embodiment is a terminal device, refer to a device shown in FIG. 18. In an example, the device can complete a function similar to a function of the processor in FIG. 17. In FIG. 18, the device includes a processor 1810, a data sending processor 1820, and a data receiving processor 1830. The processing unit 1720 in the foregoing embodiment may be the processor 1810 in FIG. 18, and completes a corresponding function. The transceiver unit 1710 in the foregoing embodiment may be the data sending processor 1820 and/or the data receiving processor 1830 in FIG. 18. Although FIG. 18 shows a channel encoder and a channel decoder, it may be understood that these modules are merely examples, and do not constitute a limitation on this embodiment.

Figure 19:
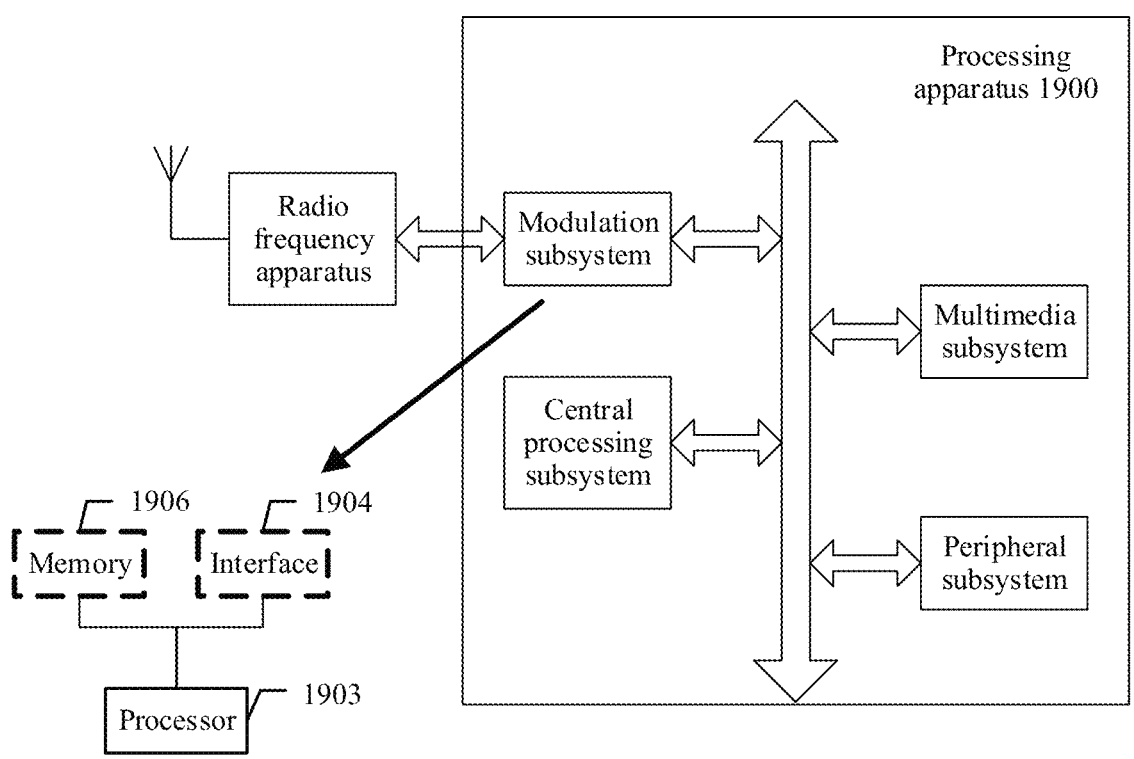
FIG. 19 is a schematic structural diagram of another communication apparatus according to this application.

FIG. 19 shows another form of this embodiment. A processing apparatus 1900 includes modules such as a modulation subsystem, a central processing subsystem, and a peripheral subsystem. A communication apparatus in this embodiment may be used as the modulation subsystem in the processing apparatus 1900. In one embodiment, the modulation subsystem may include a processor 1903 and an interface 1904. The processor 1903 completes a function of the processing unit 1720, and the interface 1904 completes a function of the transceiver unit 1710. In another variation, the modulation subsystem includes a memory 1906, a processor 1903, and a program that is stored in the memory 1906 and that can run on the processor. When executing the program, the processor 1903 implements the method on the terminal device side in the foregoing method embodiments. It should be noted that, the memory 1906 may be non-volatile or volatile, the memory 1906 may be located in the modulation subsystem or in the processing apparatus 1900, provided that the memory 1906 can be connected to the processor 1903.

In another form of this embodiment, a computer-readable storage medium is provided. The computer-readable storage medium stores instructions. When the instructions are executed, the method on the terminal device side in the foregoing method embodiments is performed.

In another form of this embodiment, a computer program product that includes instructions is provided. When the instructions are executed, the method on the terminal device side in the foregoing method embodiments is performed.

Figure 20:
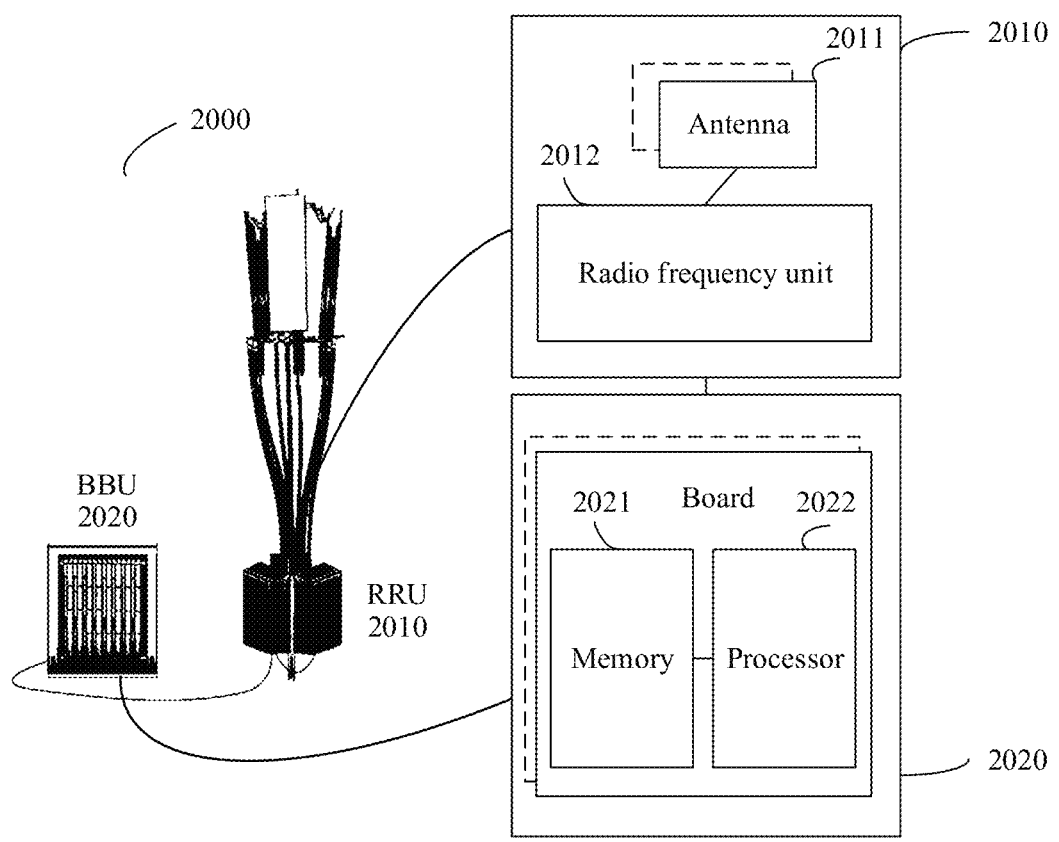
FIG. 20 is a schematic structural diagram of another communication apparatus according to this application.

When the communication apparatus in this embodiment is a network device, the network device may be that shown in FIG. 20. A communication apparatus 2000 includes one or more radio frequency units, such as a remote radio unit (RRU) 2010 and one or more baseband units (BBU) (which may also be referred to as a digital unit (DU)) 2020. The RRU 2010 may be referred to as a communication module, and corresponds to the communication module 1110 in FIG. 11. The communication module 1110 may also be referred to as a transceiver machine, a transceiver circuit, a transceiver, or the like, and may include at least one antenna and the remote radio unit 2010. The RRU 2010 is mainly configured to: send and receive a radio frequency signal, and perform conversion between the radio frequency signal and a baseband signal. For example, the RRU 2010 is configured to send a resource indication to a terminal device. The BBU 2020 is mainly configured to: perform baseband processing, control a base station, and the like. The RRU 2010 and the BBU 2020 may be physically disposed together, or may be physically separated, namely, a distributed base station.

The BBU 2020 is a control center of the base station, and may also be referred to as a processing module. The BBU 2020 may correspond to the processing module 1101 in FIG. 11, and may be configured to complete a baseband processing function such as channel coding, multiplexing, modulation, or spreading. For example, the BBU 2020 may be configured to control the network device to perform an operation procedure related to the network device in the foregoing method embodiments, for example, generate an RRC message and first information.

In an example, the BBU 2020 may include one or more boards, and a plurality of boards may jointly support a radio access network (for example, an LTE network) having a single access standard, or may separately support radio access networks (for example, an LTE network, a 5G network, or another network) having different access standards. The BBU 2020 further includes a memory 2021 and a processor 2022. The memory 2021 is configured to store instructions and data. The processor 2022 is configured to control the network device to perform an action, for example, configured to control the network device to perform an operation procedure performed by the CU, the DU and/or the network device in the foregoing method embodiments. The memory 2021 and the processor 2022 may serve one or more boards. In other words, a memory and a processor may be independently disposed on each board. Alternatively, a plurality of boards may share a same memory and a same processor. In addition, a circuit may be further disposed on each board.

Figure 21:
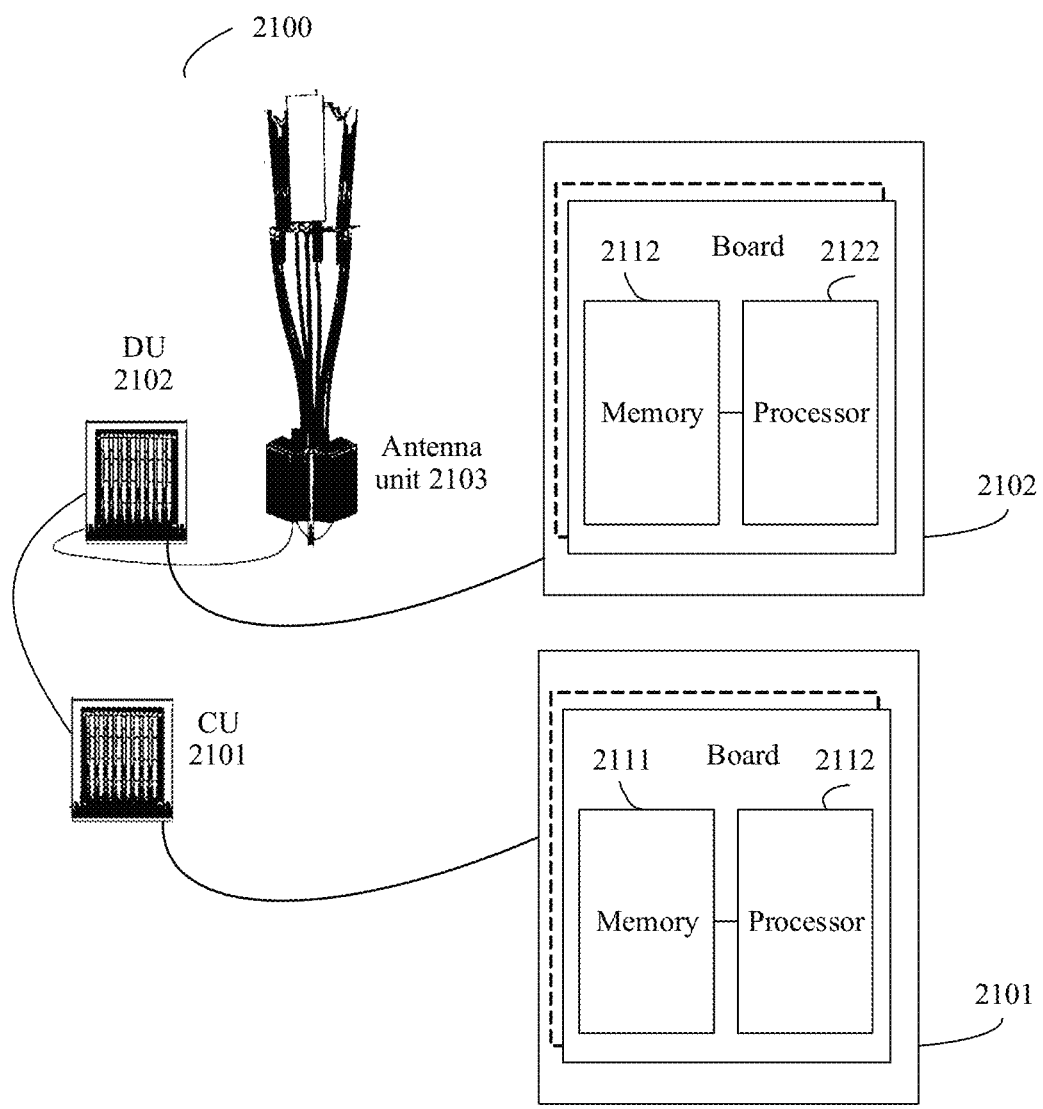
FIG. 21 is a schematic structural diagram of another communication apparatus according to this application.

In another example, a communication apparatus may further have a structure of a CU 2101 or a DU 2102 shown in FIG. 21. As shown in FIG. 21, a method provided in this embodiment of this application may include the CU 2101, the DU 2102, and an antenna unit 2103, and the antenna unit herein may be an active antenna unit (AAU) or an RRU. For a structure of the antenna unit 2103, refer to a structure of the RRU 2010 shown in FIG. 20. Details are not described herein again. The CU 2101 may be configured to implement a non-real-time wireless high-layer protocol stack function, and may also be configured to support deployment of some core networks and deployment of an edge application service. The CU 2101 may include a PDCP layer and an RRC layer. The DU 2102 may be configured to process a physical layer function and a layer (layer) 2 function with a real-time requirement. Some physical layer functions of a network device may also be transferred to the antenna unit 2103 for implementation. The DU 2101 may include an RLC layer, a MAC layer, and a PHY layer. The antenna unit 2103 has a function of the RRU 2010 shown in FIG. 2, and may be further configured to implement the baseband processing function of the BBU 2020 in the network device shown in FIG. 20. Some or all components of the CU 2101, the DU 2102, or the antenna unit 2103 may be used as a part of the network device, or may be used as a communication apparatus independent of the network device. The CU 2101, the DU 2102, and the antenna unit 2103 may be physically disposed together, or may be physically disposed separately.

As shown in FIG. 21, the CU 2101 and the DU 2102 may separately include one or more boards, and the one or more boards may jointly support the CU 2101, the DU 2102, and a radio access network (for example, an LTE network) having a single access standard, or may separately support the CU 2101, the DU 2102, and radio access networks (for example, an LTE network, a 5G network, or another network) having different access standards.

The CU 2101 may include a memory 2111 and a processor 2121. The memory 2111 is configured to store instructions and data. The processor 2121 is configured to control the CU 2101 to perform an action, for example, configured to control the CU 2101 to perform an operation procedure performed by the CU in the foregoing method embodiments. The memory 2111 and the processor 2121 may serve one or more boards. In other words, a memory and a processor may be independently disposed on each board. Alternatively, a plurality of boards may share a same memory and a same processor. In addition, a circuit may be further disposed on each board. The CU 2101 may further have a structure shown in FIG. 9 or FIG. 13. In other words, the CU 2101 may have a function of the communication apparatus shown in FIG. 9 or FIG. 13. Therefore, the CU 2101 may perform an operation that can be performed by the communication apparatus shown in FIG. 9 or FIG. 13. The processor 2121 may be configured to perform a function performed by the processor 1320 shown in FIG. 13.

The DU 2102 may include a memory 2112 and a processor 2122. The memory 2112 is configured to store instructions and data. The processor 2122 is configured to control the DU 2102 to perform an action, for example, configured to control the DU 2102 to perform an operation procedure performed by the DU in the foregoing method embodiments. The memory 2111 and the processor 2121 may serve one or more boards. In other words, a memory and a processor may be independently disposed on each board. Alternatively, a plurality of boards may share a same memory and a same processor. In addition, a circuit may be further disposed on each board. The DU 2102 may further have a structure shown in FIG. 10 or FIG. 14. In other words, the DU 2102 may have a function of the communication apparatus shown in FIG. 10 or FIG. 14. Therefore, the DU 2102 may perform an operation that can be performed by the communication apparatus shown in FIG. 10 or FIG. 14. The processor 2121 may be configured to perform a function performed by the processor 1420 shown in FIG. 14.

The CU 2101, the DU 2102, and the antenna unit 2103 shown in FIG. 21 may form an NR base station.

It should be understood that, the processor mentioned in the embodiments of the application may be a central processing unit (CPU), or may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor, or the like.

It should be further understood that the memory mentioned in the embodiments of the application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory, used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general purpose processor, a DSP, an ASIC, an FPGA or another programmable logic device, a discrete gate or a transistor logic device, or a discrete hardware component, the memory (a storage module) is integrated into the processor.

It should be noted that the memory described in this specification is intended to include but is not limited to these memories and any memory of another proper type.

It should be further understood that "first", "second", "third", "fourth", and various numbers in this specification are merely distinguished for convenient description, and are not intended to limit the scope of this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that, in various embodiments of this application, sequence numbers of the foregoing processes do not mean execution sequences. The execution sequences of the processes should be determined based on functions and internal logic of the processes, and should not be construed as any limitation on the implementation processes of the embodiments of the application.

A person of ordinary skill in the art may be aware that units and algorithm operations in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, and may be located in one position, or may be distributed on a plurality of network units. Some or all of the units may be selected based on an actual requirement to achieve the objective of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of this application. The foregoing storage medium includes: any medium that can store program code, for example a USB flash drive, a removable hard disk drive, a read-only memory, a random access memory, a magnetic disk, or an optical disc.

The foregoing descriptions are merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A radio resource control (RRC) message sending method comprising:
generating, by a centralized unit (CU), first information; and
sending, by the CU, the first information to a distributed unit (DU), wherein the first information is used to indicate to the DU not to start a radio link layer control protocol (RLC) polling mechanism when the DU sends an RRC message to a terminal apparatus.

2. The method according to claim 1, further comprising:
generating, by the CU, the RRC message; and
the sending, by the CU, the first information to a DU comprises:
sending, by the CU, a first message to the DU, wherein the first message comprises the RRC message and the first information.

3. The method according to claim 2, wherein,
the first message is a downlink RRC transmission message; or
the first message is a terminal context setup request message.

4. The method according to claim 1, wherein,
the first information is used to indicate to the DU to set, when the DU sends the RRC message to the terminal apparatus, a polling bit in a header of an RLC protocol data unit (PDU) carrying the RRC message to be in an inactive state; or
the first information is used to indicate to the DU not to trigger polling when the DU sends the RRC message to the terminal apparatus.

5. The method according to claim 1, wherein,
the first information is carried in a downlink RRC transmission message; or
the first information is carried in a terminal context setup request message.

6. The method according to claim 1, wherein the RRC message comprises at least one of the following messages:
an RRC reestablishment message; or
an RRC reestablishment message and an RRC reconfiguration message; or
an RRC resume message.

7. A radio resource control (RRC) message sending method comprising:
- determining, by a distributed unit (DU), not to start an RLC polling mechanism when sending an RRC message; and
- setting, by the DU, when sending the RRC message to a terminal apparatus, a polling bit in a header of an RLC PDU carrying the RRC message to be in an inactive state.

8. The method according to claim 7, wherein the determining, by a DU, not to start an RLC polling mechanism, when sending the RRC message comprises:
- determining, by the DU, that the RRC message is the first RRC message sent to the terminal apparatus through a first signaling channel; or
- determining, by the DU, that first information sent by a CU is received, wherein the first information is used to indicate the DU not to start the RLC polling mechanism when the DU sends the RRC message.

9. The method according to claim 8, wherein,
- the first information is used to indicate to the DU to set, when the DU sends the RRC message to the terminal apparatus, the polling bit in the header of the RLC PDU carrying the RRC message to be in the inactive state; or
- the first information is used to indicate to the DU not to trigger polling when the DU sends the RRC message to the terminal apparatus.

10. The method according to claim 8, wherein,
- the first information is carried in a downlink RRC transmission message; or
- the first information is carried in a terminal context setup request message.

11. The method according to claim 8, further comprising:
- receiving, by the DU, a first message from the CU, wherein the first message comprises the RRC message and the first information.

12. The method according to claim 11, wherein,
- the first message is a downlink RRC transmission message; or
- the first message is a terminal context setup request message.

13. The method according to claim 7, further comprising:
- indicating, by the DU, a first uplink transmission resource to the terminal apparatus, wherein the first uplink transmission resource is used by the terminal apparatus to request an uplink transmission resource from the DU.

14. The method according to claim 7, wherein the RRC message comprises at least one of the following messages:
- an RRC reestablishment message; or
- an RRC reestablishment message and an RRC reconfiguration message; or
- an RRC resume message.

15. A communication apparatus comprising:
- a processing module configured to generate first information; and
- a communication module configured to send the first information to a distributed unit (DU), wherein the first information is used to indicate to the DU not to start a radio link layer control protocol (RLC) polling mechanism when the DU sends an RRC message to a terminal apparatus.

16. The communication apparatus according to claim 15, wherein the processing module is further configured to:
- generate the RRC message; and
- when sending the first information to the DU, the communication module is configured to:
- send a first message to the DU, wherein the first message comprises the RRC message and the first information.

17. The communication apparatus according to claim 16, wherein,
- the first message is a downlink RRC transmission message; or
- the first message is a terminal context setup request message.

18. The communication apparatus according to claim 15, wherein,
- the first information is used to indicate to the DU to set, when the DU sends the RRC message to the terminal apparatus, a polling bit in a header of an RLC protocol data unit (PDU) carrying the RRC message to be in an inactive state; or
- the first information is used to indicate the DU not to trigger polling when the DU sends the RRC message to the terminal apparatus.

19. The communication apparatus according to claim 15, wherein,
- the first information is carried in a downlink RRC transmission message; or
- the first information is carried in a terminal context setup request message.

20. The communication apparatus according to claim 15, wherein the RRC message comprises at least one of the following messages:
- an RRC reestablishment message; or
- an RRC reestablishment message and an RRC reconfiguration message; or
- an RRC resume message.

* * * * *